United States Patent
Chendamarai Kannan et al.

(10) Patent No.: US 10,368,301 B2
(45) Date of Patent: Jul. 30, 2019

(54) MULTI-BEAM AND SINGLE-BEAM DISCOVERY REFERENCE SIGNALS FOR SHARED SPECTRUM

(71) Applicant: QUALCOMM Incorporated, San Diego, CA (US)

(72) Inventors: Arumugam Chendamarai Kannan, San Diego, CA (US); Chirag Patel, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/675,217

(22) Filed: Aug. 11, 2017

(65) Prior Publication Data

US 2018/0242232 A1  Aug. 23, 2018

Related U.S. Application Data

(60) Provisional application No. 62/461,671, filed on Feb. 21, 2017.

(51) Int. Cl.
*H04W 48/16* (2009.01)
*H04W 16/28* (2009.01)
(Continued)

(52) U.S. Cl.
CPC .......... *H04W 48/16* (2013.01); *H04B 7/0695* (2013.01); *H04L 5/005* (2013.01);
(Continued)

(58) Field of Classification Search
CPC ..... H04W 48/16; H04W 72/04; H04W 16/14; H04W 16/28; H04W 17/309;
(Continued)

(56) References Cited

U.S. PATENT DOCUMENTS

2009/0190566 A1* 7/2009 Kwon .................. H04W 74/02
370/345
2012/0231825 A1* 9/2012 Gossain ................ H04W 72/02
455/509

(Continued)

OTHER PUBLICATIONS

Partial International Search Report—PCT/US2018/014482—ISA/EPO—dated Jun. 7, 2018 (171874WO).

(Continued)

*Primary Examiner* — Meless N Zewdu
(74) *Attorney, Agent, or Firm* — Liem T. Do

(57) ABSTRACT

Methods, systems, and devices for wireless communications are described. The method may include determining multiple transmission beams (e.g., beamformed directional beams) for transmission of an opportunistic or multi-beam discovery reference signal (DRS) over a shared radio frequency spectrum band. A base station may perform a listen before talk (LBT) procedure for the multiple DRS transmission beams, and transmit, based on the LBT procedure, the DRS over the shared radio frequency spectrum band using a set of the multiple transmission beams (e.g., a set that cleared an LBT procedure). In some cases, the LBT may be performed for each transmission beam, or for a union of all transmission beams, associated with the DRS transmission beams. Alternatively, the base station may determine a contention exempt transmission (CET) period for the shared spectrum band and transmit the DRS using the multiple transmission beams during CET period.

22 Claims, 16 Drawing Sheets

(51) Int. Cl.
*H04W 72/04* (2009.01)
*H04B 17/309* (2015.01)
*H04W 16/14* (2009.01)
*H04L 5/00* (2006.01)
*H04B 7/06* (2006.01)
*H04W 88/08* (2009.01)

(52) U.S. Cl.
CPC ........... *H04L 5/0048* (2013.01); *H04W 16/14* (2013.01); *H04W 16/28* (2013.01); *H04W 72/046* (2013.01); *H04W 72/0453* (2013.01); *H04B 17/309* (2015.01); *H04L 5/0037* (2013.01); *H04L 5/0091* (2013.01); *H04W 88/08* (2013.01)

(58) Field of Classification Search
CPC ............. H04W 72/046; H04W 40/244; H04W 40/246; H04W 40/24; H04W 72/12; H04W 28/26; H04W 48/08; H04W 88/08; H04W 88/00; H04W 88/02; H04W 48/20; H04W 8/005; H04W 72/0453; H04B 7/0408; H04B 7/0413; H04B 7/0897; H04B 17/309; H04B 7/0695; H04L 5/0091; H04L 5/0037; H04L 5/005; H04L 5/0048
See application file for complete search history.

(56) References Cited

U.S. PATENT DOCUMENTS

| | | | |
|---|---|---|---|
| 2015/0208443 | A1 | 7/2015 | Jung et al. |
| 2015/0358827 | A1* | 12/2015 | Bendlin ............ H04W 72/0413 455/454 |
| 2015/0365880 | A1 | 12/2015 | Malladi et al. |
| 2016/0007353 | A1 | 1/2016 | Malladi et al. |
| 2016/0037560 | A1 | 2/2016 | Liu et al. |
| 2016/0073366 | A1* | 3/2016 | Ng ...................... H04W 56/001 370/329 |
| 2016/0127098 | A1 | 5/2016 | Ng et al. |
| 2016/0143014 | A1* | 5/2016 | Mukherjee et al. ........................ H04W 72/044 |
| 2016/0345216 | A1* | 11/2016 | Kishiyama ........ H04W 36/0083 |
| 2017/0006593 | A1 | 1/2017 | Liu |
| 2017/0013469 | A1* | 1/2017 | Larsson ................ H04W 16/14 |
| 2017/0041805 | A1* | 2/2017 | Chandrasekhar ............................ H04W 74/0816 |
| 2017/0222693 | A1* | 8/2017 | Shen ...................... H04B 7/043 |
| 2017/0230986 | A1* | 8/2017 | Moon ................... H04W 74/08 |
| 2017/0290048 | A1* | 10/2017 | Amuru ............. H04W 72/0446 |
| 2018/0115996 | A1* | 4/2018 | Si ...................... H04W 74/0816 |

OTHER PUBLICATIONS

International Search Report and Written Opinion—PCT/US2018/014482—ISA/EPO—dated Aug. 13, 2018 (171874WO).

* cited by examiner

US 10,368,301 B2

MULTI-BEAM AND SINGLE-BEAM DISCOVERY REFERENCE SIGNALS FOR SHARED SPECTRUM

CROSS REFERENCES

The present application for patent claims priority to U.S. Provisional Patent Application No. 62/461,671 by Chendamarai Kannan, et al., entitled "Multi-Beam and Single-Beam Discovery Reference Signals For Shared Spectrum," filed Feb. 21, 2017, assigned to the assignee hereof.

BACKGROUND

The following relates generally to wireless communication, and more specifically to multi-beam and single-beam discovery reference signals (DRS) for shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. That is, wireless communications between two wireless nodes, e.g., between a base station and a UE, may use beams or beamformed signals for transmission and/or reception.

Critical communication signals (e.g., reference signals for discovery or synchronization) in shared spectrum communication systems (e.g., systems with multiple operators using the spectrum) may require contention procedures such as channel sensing for fair access to the shared spectrum. Further, frequent or periodic/semi-periodic transmission of such signals may cause overcrowding and result in coexistence issues. Improved design and techniques for reference signaling in shared spectrum communication systems may thus be desired.

SUMMARY

The described techniques relate to improved methods, systems, devices, or apparatuses that support guaranteed/semi-guaranteed and/or opportunistic transmission of multi-beam and single-beam reference signals (e.g., DRS) for shared spectrum. Generally, the described techniques provide for identifying multiple directions (e.g., transmission beams in a millimeter wave (mmW) system) for transmission of discovery reference signals (DRS) over a shared radio frequency spectrum band. A base station may perform one or more listen before talk (LBT) procedures for the DRS to contend for access to the shared spectrum. The LBT procedures may be based on one or more of the identified transmission beams to be used for DRS transmission. The DRS may then be transmitted over the shared radio frequency spectrum band using a set of the multiple transmission beams. The set of transmission beams used for DRS transmission may be based on the success of the one or more LBT procedures.

In some cases, the base station may identify a contention exempt transmission (CET) period for the shared radio frequency spectrum band. The base station may then identify multiple transmission beams for transmission of DRS over the shared spectrum, and transmit the DRS during the CET period using the multiple transmission beams. In such cases, the DRS may be transmitted without performing contention procedures. In some aspects, the base station may additionally transmit a reservation signal prior to the DRS, regardless of whether DRS is contingent on a successful contention procedure or transmitted in a CET period. The reservation signal may indicate to other wireless devices that the shared radio frequency spectrum band is reserved (e.g., for DRS transmission). Transmission of the reservation signal may be based on one or more of the identified transmission beams to be used for DRS transmission. A method of for wireless communication is described.

The method may include determining a CET period for a shared radio frequency spectrum band, determining multiple transmission beams for transmission of a DRS over the shared radio frequency spectrum band, and transmitting, over the shared radio frequency spectrum band, the DRS using the multiple transmission beams during the CET period.

An apparatus for wireless communication is described. The apparatus may include means for determining a CET period for a shared radio frequency spectrum band, means for determining multiple transmission beams for transmission of a DRS over the shared radio frequency spectrum band, and means for transmitting, over the shared radio frequency spectrum band, the DRS using the multiple transmission beams during the CET period.

Another apparatus for wireless communication is described. The apparatus may include a processor, memory in electronic communication with the processor, and instructions stored in the memory. The instructions may be operable to cause the processor to determine a CET period for a shared radio frequency spectrum band, determine multiple transmission beams for transmission of a DRS over the shared radio frequency spectrum band, and transmit, over the shared radio frequency spectrum band, the DRS using the multiple transmission beams during the CET period.

A non-transitory computer readable medium for wireless communication is described. The non-transitory computer-readable medium may include instructions operable to cause a processor to determine a CET period for a shared radio frequency spectrum band, determine multiple transmission beams for transmission of a DRS over the shared radio frequency spectrum band, and transmit, over the shared radio frequency spectrum band, the DRS using the multiple transmission beams during the CET period.

In some examples of the method, apparatus, and non-transitory computer-readable medium described above, transmitting the DRS comprises: periodically transmitting the DRS over the shared radio frequency spectrum band at fixed intervals.

Some examples of the method, apparatus, and non-transitory computer-readable medium described above may further include processes, features, means, or instructions for determining the fixed intervals based at least in part on a duty cycle associated with transmission of the DRS.

Some examples of the method, apparatus, and non-transitory computer-readable medium described above may further include processes, features, means, or instructions for transmitting, prior to transmission of the DRS, a reservation signal over a union of the multiple transmission beams.

In some examples of the method, apparatus, and non-transitory computer-readable medium described above, the reservation signal indicates that at least a portion of the shared radio frequency spectrum band may be reserved.

A method of for wireless communication is described. The method may include determining multiple transmission beams for transmission of a DRS over a shared radio frequency spectrum band, performing a LBT procedure for the DRS based at least in part on the multiple transmission beams, and transmitting, based at least in part on the LBT procedure, the DRS over the shared radio frequency spectrum band using a set of the multiple transmission beams.

An apparatus for wireless communication is described. The apparatus may include means for determining multiple transmission beams for transmission of a DRS over a shared radio frequency spectrum band, means for performing a LBT procedure for the DRS based at least in part on the multiple transmission beams, and means for transmitting, based at least in part on the LBT procedure, the DRS over the shared radio frequency spectrum band using a set of the multiple transmission beams.

Another apparatus for wireless communication is described. The apparatus may include a processor, memory in electronic communication with the processor, and instructions stored in the memory. The instructions may be operable to cause the processor to determine multiple transmission beams for transmission of a DRS over a shared radio frequency spectrum band, perform a LBT procedure for the DRS based at least in part on the multiple transmission beams, and transmit, based at least in part on the LBT procedure, the DRS over the shared radio frequency spectrum band using a set of the multiple transmission beams.

A non-transitory computer readable medium for wireless communication is described. The non-transitory computer-readable medium may include instructions operable to cause a processor to determine multiple transmission beams for transmission of a DRS over a shared radio frequency spectrum band, perform a LBT procedure for the DRS based at least in part on the multiple transmission beams, and transmit, based at least in part on the LBT procedure, the DRS over the shared radio frequency spectrum band using a set of the multiple transmission beams.

Some examples of the method, apparatus, and non-transitory computer-readable medium described above may further include processes, features, means, or instructions for determining the set of multiple transmission beams based at least in part on a success of the LBT procedure for at least one of the multiple transmission beams.

In some examples of the method, apparatus, and non-transitory computer-readable medium described above, performing the LBT procedure comprises: performing the LBT procedure over a union of the multiple transmission beams.

In some examples of the method, apparatus, and non-transitory computer-readable medium described above, the LBT procedure comprises an energy sensing LBT procedure.

In some examples of the method, apparatus, and non-transitory computer-readable medium described above, may further include processes, features, means, or instructions for one or both of receiving a channel reservation signal on each of the multiple transmission beams and sensing energy over at least one of the multiple transmission beams.

Some examples of the method, apparatus, and non-transitory computer-readable medium described above may further include processes, features, means, or instructions for transmitting, based at least in part on a success of the LBT procedure, a reservation signal over a union of the multiple transmission beams.

In some examples of the method, apparatus, and non-transitory computer-readable medium described above, the reservation signal indicates that at least a portion of the shared radio frequency spectrum band may be reserved.

In some examples of the method, apparatus, and non-transitory computer-readable medium described above, performing the LBT procedure comprises: performing the LBT procedure over each of the multiple transmission beams prior to transmission of the DRS.

In some examples of the method, apparatus, and non-transitory computer-readable medium described above, transmitting the DRS comprises: transmitting the DRS on each transmission beam corresponding to a successful LBT procedure.

Some examples of the method, apparatus, and non-transitory computer-readable medium described above may further include processes, features, means, or instructions for identifying gap intervals preceding each beam of the multiple transmission beams. Some examples of the method, apparatus, and non-transitory computer-readable medium described above may further include processes, features, means, or instructions for performing a beam-specific LBT procedure for each beam in respective gap intervals.

Some examples of the method, apparatus, and non-transitory computer-readable medium described above may further include processes, features, means, or instructions for determining the set of the multiple transmission beams based at least in part on a success of the beam-specific LBT procedure for at least one of the multiple beams.

Some examples of the method, apparatus, and non-transitory computer-readable medium described above may further include processes, features, means, or instructions for performing an opportunistic beam-specific LBT procedure for a first beam of the multiple transmission beams. Some examples of the method, apparatus, and non-transitory computer-readable medium described above may further include processes, features, means, or instructions for transmitting an opportunistic DRS on the first beam based at least in part on a success of the opportunistic beam-specific LBT procedure for the first beam.

In some examples of the method, apparatus, and non-transitory computer-readable medium described above, the opportunistic beam-specific LBT procedure may be performed in a direction corresponding to the first beam.

In some examples of the method, apparatus, and non-transitory computer-readable medium described above, the opportunistic DRS comprises at least one of a beam reference signal (BRS), a primary synchronization signal (PSS), a secondary synchronization signal (SSS), a physical broadcast channel (PBCH) message, or any combination thereof.

Some examples of the method, apparatus, and non-transitory computer-readable medium described above may further include processes, features, means, or instructions for transmitting, prior to transmission of the opportunistic DRS, a reservation signal in a direction corresponding to the first beam.

Some examples of the method, apparatus, and non-transitory computer-readable medium described above may further include processes, features, means, or instructions for receiving a DRS initiation request from a user equipment (UE). Some examples of the method, apparatus, and non-transitory computer-readable medium described above may further include processes, features, means, or instructions for transmitting the opportunistic DRS based at least in part on the received DRS initiation request.

In some examples of the method, apparatus, and non-transitory computer-readable medium described above, the opportunistic DRS may be transmitted within a time window after reception of the DRS initiation request.

In some examples of the method, apparatus, and non-transitory computer-readable medium described above, a priority class associated with the opportunistic DRS on the first beam may be different from a priority class associated with the DRS on a corresponding beam of the multiple transmission beams.

In some examples of the method, apparatus, and non-transitory computer-readable medium described above, the transmission of the opportunistic DRS on the first beam spans more symbols than a transmission of the DRS on a corresponding beam of the multiple transmission beams.

In some examples of the method, apparatus, and non-transitory computer-readable medium described above, the opportunistic DRS on the first beam comprises more synchronization signal (SS) blocks than the DRS on a corresponding beam of the multiple transmission beams.

In some examples of the method, apparatus, and non-transitory computer-readable medium described above, the set comprises a single transmission beam and the DRS may be transmitted periodically within a floating time window.

Some examples of the method, apparatus, and non-transitory computer-readable medium described above may further include processes, features, means, or instructions for performing an opportunistic beam-specific LBT procedure for each beam of the multiple transmission beams. Some examples of the method, apparatus, and non-transitory computer-readable medium described above may further include processes, features, means, or instructions for transmitting an opportunistic DRS on each beam of the multiple transmission beams associated with a successful opportunistic beam-specific LBT procedure.

Some examples of the method, apparatus, and non-transitory computer-readable medium described above may further include processes, features, means, or instructions for staggering a time interval between a first opportunistic beam-specific LBT procedure and a second opportunistic beam-specific LBT procedure within a time window.

In some examples of the method, apparatus, and non-transitory computer-readable medium described above, the staggering may be based at least in part on a success of the first or the second opportunistic beam-specific LBT procedure.

DETAILED DESCRIPTION

Figure 1:
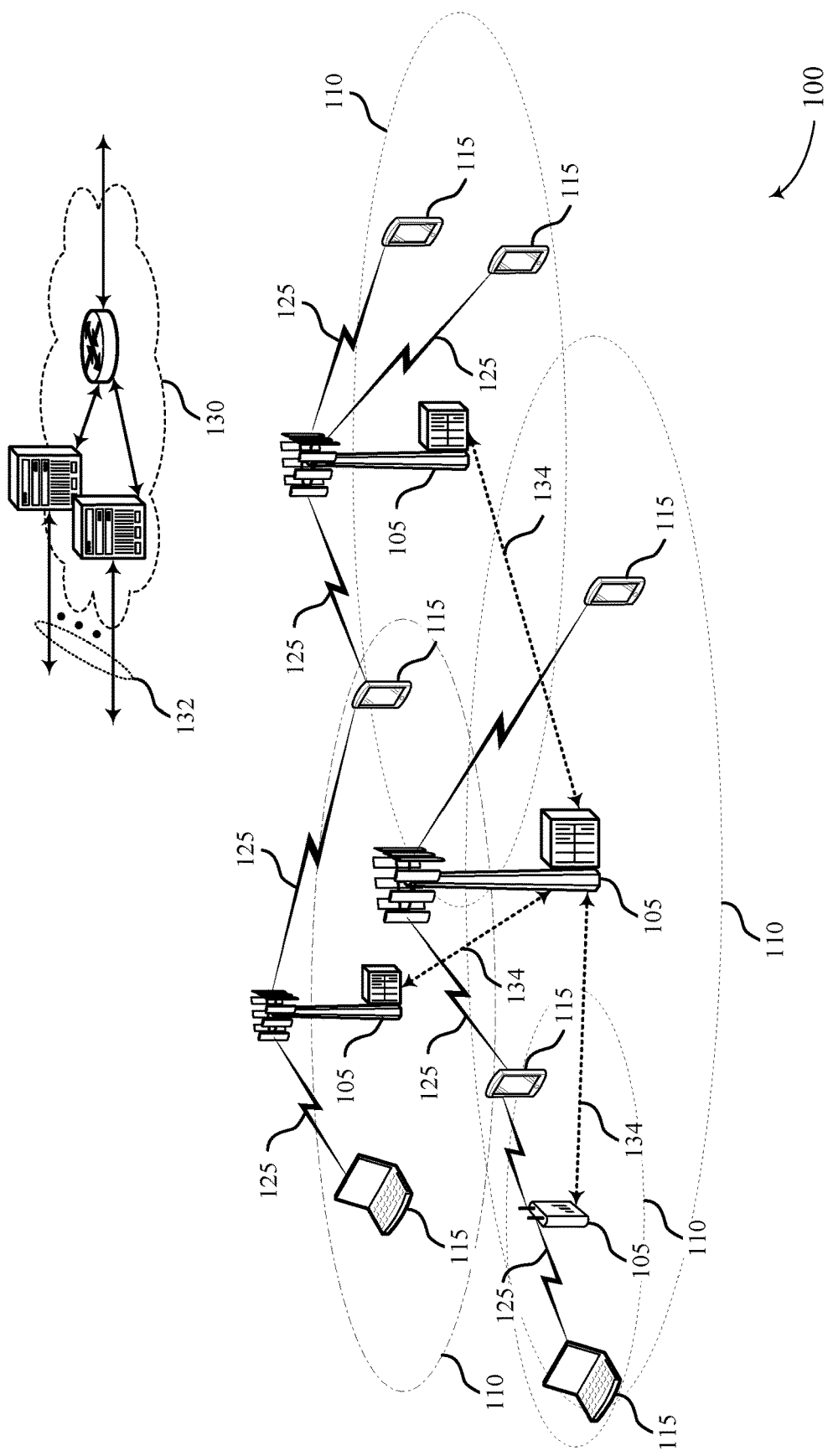
FIG. 1 illustrates an example of a wireless communication system that supports multi-beam and single-beam discovery reference signals (DRS) for shared spectrum in accordance with aspects of the present disclosure.

A wireless communications system (e.g., a millimeter wave (mmW) system) may utilize directional or beamformed transmissions (e.g., transmission beams) for communications. For example, a base station may transmit signals and perform contention procedures on multiple transmission beams (e.g., associated with different directions). In some cases, the base station may engage in beam sweeping over a portion of or all possible transmission beams for messages or signals intended for wireless devices distributed throughout the coverage area of the base station. For example, a base station may transmit discovery reference signals (DRS) using one or more transmission beams to facilitate cell synchronization and discovery throughout the coverage area.

In shared spectrum communication systems, the base station may perform a listen before talk (LBT) procedure to contend for access to the medium prior to transmitting DRS on the identified transmission beams. The LBT procedure may be performed individually for each identified transmission beam, or performed for the union of the identified transmission beams (e.g., a pseudo-omnidirectional LBT procedure). In the case where an LBT procedure is performed individually for each identified transmission beam, the multiple LBT procedures may all be performed in advance, or may individually be performed prior to the associated DRS transmission (e.g., interleaved). In some cases, DRS may be transmitted only on transmission beams or directions that clear an LBT procedure (e.g., directional LBT or pseudo-omnidirectional LBT). In other cases, a base station may transmit DRS signals during a contention exempt transmission (CET) period. During a CET period, a base station may transmit DRS without contending for access to the shared radio frequency spectrum band. In some cases, prior to transmission of DRS (e.g., in a CET period, or following a successful LBT procedure), the base station may transmit a reservation signal to indicate to other wireless devices the medium is reserved.

According to the present disclosure, a base station may transmit DRS in a multi-beam and/or opportunistic fashion. A multi-beam DRS (e.g., for New Radio (NR) mmW operation) may include temporally sequential DRS transmission on multiple transmission beams. Additionally or alternatively, opportunistic DRS may refer to DRS opportunistically transmitted in one or more beam directions (e.g., transmission beam). Opportunistic DRS may be transmitted in addition to multi-beam DRS within an inter-DRS interval. Opportunistic DRS may be initiated by the base station or a wireless device. That is, DRS may be multi-beam (e.g., multiple directional beams) or single-beam (e.g., a single directional beam). Further, DRS may be transmitted in a guaranteed/semi-guaranteed fashion (e.g., DRS may be transmitted periodically or within a given time window) or in an opportunistic fashion (e.g., when a set of parameters or conditions are met). In some cases, the single-beam DRS and/or multi-beam DRS may include a beam reference signal, which may be frequency division multiplexed with synchronization signals.

The contents of the single-beam DRS may depend on whether the DRS is initiated by a user equipment (UE) or a base station. For example, a single-beam DRS may be a thin DRS containing the timing reference/cell identification (ID) and reference signal(s) for UE measurements (e.g., primary synchronization signal (PSS)/secondary synchronization signal (SSS) only). In other examples, the single-beam DRS may include timing reference/cell ID in addition to parts of system information, random access related information, and additional information related to beam tracking.

Aspects of the disclosure are initially described in the context of a wireless communications system. Examples of signaling and transmission timelines for multi-beam and opportunistic reference signals are then described. Aspects of the disclosure are further illustrated by and described with reference to apparatus diagrams, system diagrams, and flowcharts that relate to guaranteed/semi-guaranteed and/or opportunistic transmission of multi-beam and single-beam reference signals (e.g., DRS) for shared spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a long term evolution (LTE) (or LTE-Advanced (LTE-A)) network, or an NR network. In some cases, wireless communications system 100 may support enhanced broadband communications, ultra-reliable (i.e., mission critical) communications, low latency communications, and communications with low-cost and low-complexity devices. Wireless communications system 100 may support guaranteed/semi-guaranteed and/or opportunistic transmission of multi-beam and single-beam reference signals (e.g., DRS) for shared spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as one or more of the base stations 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, a TRP may be an example of a base station. In some configurations, various functions of each access network entity or base station 105 may be distributed across various network devices (e.g., radio heads and access network controllers) or consolidated into a single network device (e.g., a base station 105).

In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than ultra-high frequency (UHF) antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless communications systems use a transmission scheme between a transmitter (e.g., a base station) and a receiver (e.g., a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared radio frequency spectrum band (where more than one operator is allowed to use the spectrum). In some cases, the shared radio frequency spectrum band may be spectrum band utilized in an NR shared spectrum system. An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may include one or multiple symbols. In some cases, the TTI duration (that is, the number of symbols in a TTI) may be variable. A device, such as a UE 115 or base station 105, utilizing eCCs may transmit wideband signals (e.g., 20, 40, 60, 80 MHz, etc.) at reduced symbol durations (e.g., 16.67 microseconds).

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as shared radio frequency spectrum band. When operating in unlicensed radio frequency spectrum bands (e.g., shared spectrum), wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases (e.g., in a system supporting eCC operation), a combination of synchronization signals, system information signals, and reference signals may be collectively known as discovery reference signals (DRS). DRS may be used for initial acquisition, neighbor cell acquisition, or the measurements of serving and neighboring cells. As such, DRS may be used for synchronization and discovery in wireless communications system 100. In some cases (e.g., sub-6 GHz communication systems), DRS may be broadcasted periodically as an omnidirectional transmission (e.g., so that all UEs 115 may discover the cell). In other cases (e.g., mmW systems), omnidirectional transmissions may not have the same range as beamformed directional transmissions (e.g., 20-30 dB loss) and may employ different DRS periodicities. In shared spectrum, multiple operators may cause DRS crowding and result in coexistence issues (e.g., DRS may further require channel sensing such as LBT). However, reduced DRS transmission may negatively impact discovery, synchronization, and other related procedures.

As described herein, base stations 105 may employ directional transmission schemes (e.g., utilize multiple transmission beams). For example, a directional (e.g., opportunistic) LBT may utilize directional LBT timers maintained in multiple directions supported by the wireless device (e.g., a base station 105). Prior to transmitting a first transmission in a given direction, the base station 105 may perform a directional LBT procedure on the channel or direction. In some cases, if the channel is available, the base station 105 may send a transmitter-specific directional channel reservation message (e.g., a filler signal) in the given direction over the channel, followed by an opportunistic (e.g., in one direction) DRS. Some techniques described may include LBT procedures, reservation signals, and DRS over multiple directions (e.g., multi-beam applications). In such cases, wireless communications system 100 may employ multi-beam DRS beam sweeping across transmission beams. Further, some examples may include LBT procedures and/or reservation signal transmissions over a union of the transmission beams (e.g., directions) to be used for multi-beam DRS. DRS may be repeated periodically (e.g., repeated beam sweeping) on each beam (e.g., every 5, 10, 15, 20, 30, or 40 ms), or semi-periodically (e.g., every 5, 10, 15, 20, 30, or 40 ms with an uncertainty of x milliseconds around the time period).

Figure 2:
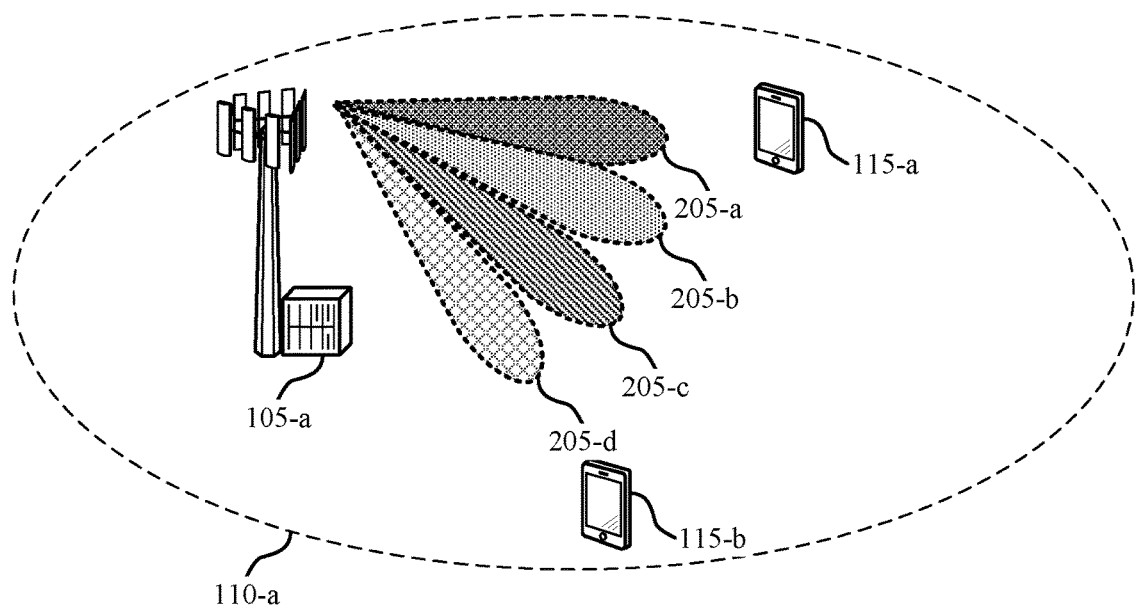
FIG. 2 illustrates an example of a wireless communication system that supports multi-beam and single-beam discovery reference signals (DRS) for shared spectrum in accordance with aspects of the present disclosure.

FIG. 2 illustrates an example of a wireless communications system 200 that supports guaranteed/semi-guaranteed and/or opportunistic transmission of multi-beam and single-beam reference signals (e.g., DRS) for shared spectrum in accordance with various aspects of the present disclosure. Wireless communications system 200 may include a first UE 115-a, a second UE 115-b, and a base station 105-a, which may be examples of the corresponding devices described with reference to FIG. 1.

In wireless communications system 200 (e.g., a mmW system), base station 105-a and UEs 115, such as UE 115-a and UE 115-b, may utilize transmission beams 205 (e.g., directional transmissions) for communications. For example, base station 105-a may transmit signals (e.g., data, DRS, etc.) and/or perform LBT procedures on transmission beams 205-a, 205-b, 205-c, and 205-d. For example, one or more DRSs may be transmitted in multiple directions (e.g., using different transmission beams 205) in order to cover a portion of or all of coverage area 110-a of base station 105-a. In the present illustration and the figures that follow, it should be understood teachings described herein may be extended by analogy to any number of transmission beams 205 (e.g., directional transmissions) without departing from the scope of the disclosure.

Multi-beam DRS (e.g., for NR mmW operation) may include DRS transmission on transmission beams 205-a, 205-b, 205-c, and 205-d. DRS may be repeated on each transmission beam 205 (e.g., sequentially or periodically). Additionally or alternatively, opportunistic DRS may refer to DRS opportunistically transmitted in one or more beam directions (e.g., transmission beam 205-b). Single-beam DRS may be transmitted in addition to multi-beam DRS within an inter-DRS interval.

Opportunistic DRS may be initiated by a base station 105-a or UEs 115. In some cases, single-beam DRS and/or multi-beam DRS may include a beam reference signal, and may be frequency division multiplexed with synchronization signals. In some cases, a directional beam associated with an opportunistic DRS may occupy more symbols (e.g., more OFDM symbols) than each directional beam of a multi-beam DRS. This may result from opportunistic DRS transmitting a different (e.g., larger) number of synchronization signal (SS) blocks compared to each beam of a multi-beam DRS. For example, an opportunistic block may transmit two SS blocks, each spanning one symbol (e.g., one transmission beam carrying two instances of PSS/SSS/physical broadcast channel (PBCH)) and whereas a directional DRS of a multi-beam DRS may span a single SS block per symbol.

A base station 105-a may initiate an opportunistic DRS. For example, the base station 105-a may transmit pseudo-periodically (e.g., contingent on medium availability). Base station 105-a initiation of opportunistic DRS may enable staggering of DRS over multiple transmission beams 205 (e.g., directions) which may reduce initial acquisition time, opportunities for measurements, beam tracking, etc. In one example, DRS may be piggybacked with a shared channel or a control channel (e.g., physical downlink shared channel (PDSCH) or a physical downlink control channel (PDCCH)) transmissions on a given transmission beam. In another example, DRS may be transmitted periodically within a floating time window (e.g., T msec to T+W msec).

UEs 115 may also initiate opportunistic DRS on demand. For example, UE 115-a may desire reference signals for measurements, beam tracking, etc. (e.g., DRS may contain beam reference signals). In such cases, the opportunistic DRS may not necessarily be UE-specific, as the base station 105 may transmit opportunistic DRS instead. The UE initiated opportunistic DRS (e.g., initiated by UE 115-a) may be transmitted within a time window of T to T+W ms after a request from UE 115-a (e.g., via multi-bit scheduling request (SR)).

The contents of the single-beam DRS may depend on whether the DRS is initiated by a UE 115-, UE 115-b, or a base station 105-a. For example, a single-beam DRS may be a thin DRS containing the timing reference/cell ID and reference signal for measurements by UE 115-a or UE 115-b (e.g., PSS/SSS only). In other examples, the single-beam DRS may include timing reference/cell ID in addition to parts of system information, random access related information, and additional information related to beam tracking.

In some cases, a base station 105-a may transmit DRS signals during a CET period. During a CET period, base station 105-a may not contend (e.g., not perform an LBT procedure) for access to the shared radio frequency spectrum band. In some examples, base station 105-a may transmit multi-beam DRS during a CET such that multiple beam directions (e.g., transmission beams 205-a, 205-b, 205-c, and 205-d) may be covered within the CET. In other examples, base station 105-a may stagger the opportunistic (e.g., directional) DRS signals across different CETs or stagger timing of DRS signals within a given time interval.

In some examples, a pseudo-omnidirectional LBT procedure may be used such that LBT is performed over the union of all beam directions (e.g., transmission beams) prior to DRS transmission over each beam direction. The DRS symbols may then be transmitted sequentially following a successful union-beam LBT procedure. In some cases (e.g., where a link may not yet be established with intended UEs 115), the pseudo-omnidirectional LBT procedure may include energy sensing in each given beam direction. Alternatively, the base station 105-a may read existing channel reservation signals on each beam direction and/or combine with energy sensing before each transmission. Further, the base station 105-a may send a pseudo-omnidirectional reservation signal (e.g., a union-beam filler signal across a beam spanning all directional DRS transmission beams) to indicate to other wireless devices that the medium is reserved until the start of a symbol or slot boundary at which the DRS will be transmitted.

In other examples, a directional LBT may be performed sequentially on each beam direction (e.g., transmission beam 205-a, 205-b, 205-c, and 205-d) prior to the start of a multi-beam DRS (e.g., the directional DRS transmitted sequential on each beam the LBT was performed on). In such cases, directional DRS may be transmitted only on transmission beams 205 or directions that clear a directional LBT. In some cases, a union-beam reservation signal may again be used between the directional LBTs and the directional DRS transmissions to ensure the medium will not be occupied by another wireless device on any particular transmission beam 205 (e.g., in the gap between LBT channel sensing and the actual transmission if the two are not contiguous). In some cases, DRS transmissions described herein may be associated with a higher priority class than regular traffic. Additionally, multi-beam DRS may be associated with a higher priority class than single-beam DRS.

Figure 3:
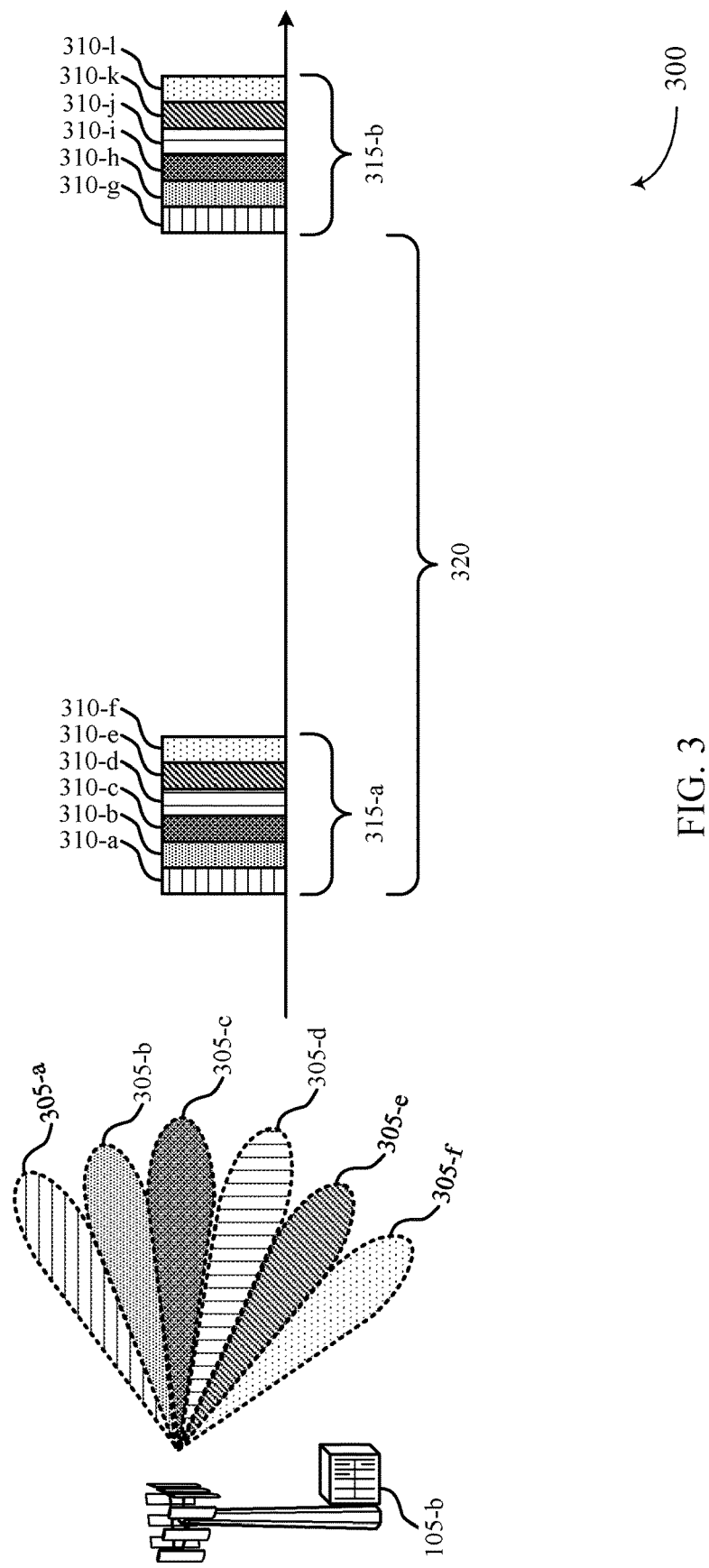
FIG. 3 illustrates a multi-beam CET reference signaling example that supports multi-beam and single-beam discovery reference signals (DRS) for shared spectrum in accordance with aspects of the present disclosure.

FIG. 3 illustrates a multi-beam CET reference signaling example 300 that supports guaranteed/semi-guaranteed and/or opportunistic transmission of multi-beam and single-beam reference signals (e.g., DRS) for shared spectrum in accordance with various aspects of the present disclosure. Example 300 includes a base station 105-b capable of transmitting over at least transmission beams 305-a, 305-b, 305-c, 305-d, 305-e, and 305-f Transmission beams 305 may be used to transmit directional DRS 310 (which may contain one SS block), as indicated by the patterns illustrated. In the present example, transmission beam 305-a may be used to transmit directional DRS 310-a and directional DRS 310-g, transmission beam 305-b may be used to transmit directional DRS 310-b and directional DRS 310-h, and so on. Directional DRS 310 may collectively be referred to as multi-beam DRSs 315 (e.g., when transmitted sequentially and/or in a beam sweeping manner) within an inter-DRS interval 320. Inter-DRS intervals 320 may repeat (e.g., periodically). Example 300 shows two multi-beam DRSs, DRS 315-a and DRS 315-b.

Due to the importance of DRSs in cell search and discovery, multi-beam DRS 315 may be transmitted in a contention-free manner (e.g., during a CET period). During a CET period, base station 105-b may not contend for access to the shared radio frequency spectrum band. For instance, the base station 105-b may not perform an LBT procedure. In some examples, base station 105-a may stagger the broadcast paging messages for different UEs 115 across different CETs. Multi-beam DRSs 315 may be transmitted periodically (e.g., every 10, 20, or 40 ms) at fixed locations (e.g., at the beginning of a DRS interval). Further, the CET may be allocated as a percentage of a duty cycle over a period of time. For example, the CET may be allocated less than X % of the duty cycle over a period of Y ms (e.g., 250 μs DRS over 20 ms may result in 1.25% of the duty cycle).

Figure 4:
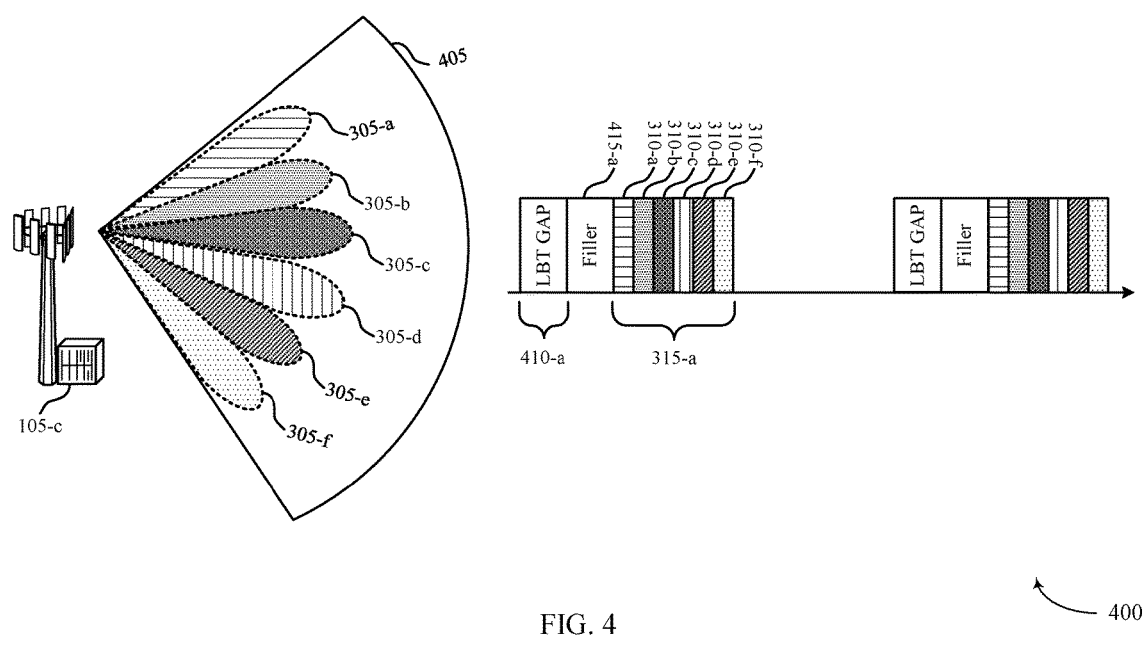
FIG. 4 illustrates a multi-beam reference signaling example that supports multi-beam and single-beam discovery reference signals (DRS) for shared spectrum in accordance with aspects of the present disclosure.

FIG. 4 illustrates an example of DRS signaling 400 that supports guaranteed/semi-guaranteed and/or opportunistic transmission of multi-beam and single-beam reference signals (e.g., DRS) for shared spectrum in accordance with various aspects of the present disclosure. In this example, a base station 105-c capable of transmitting over transmission beams 305, which may be used to transmit directional DRS 310, as indicated by the patterns illustrated and as described with reference to FIG. 3. Directional DRS 310-a, 310-b, 310-c, 310-d, 310-e, and 310-f may collectively be referred to as multi-beam DRS 315-a.

In some cases, base station 105-c may contend for access to the shared radio frequency spectrum band (e.g., perform an LBT procedure) prior to transmitting both the broadcast paging message and the unicast paging message. In this example, a pseudo-omnidirectional LBT (e.g., a union-beam LBT) procedure may be used to contend for access to transmit multi-beam DRS 315. A union-beam LBT procedure may be performed over union-beam 405, which may be a collective of the directions of transmission beams 305 to be used for multi-beam DRS 315-a. That is, union-beam 405 may be the union of all directions over which DRS will be sent. Further, the union-beam LBT procedure may be performed during an LBT gap prior to transmission of a multi-beam DRS 315-a. In some cases, a filler signal 415 (e.g., a reservation signal) may be transmitted after a successful union-beam LBT procedure to reserve the medium until transmission of multi-beam DRS 315-a.

In the present example, base station 105-c may intend to transmit a multi-beam DRS 315-a. Base station 105-c may perform a union-beam LBT procedure using union-beam 405. Union-beam 405 may be a transmission beam or direction associated with the union of transmission beams 305-a, 305-b, 305-c, 305-d, 305-e, and 305-f. A union-beam LBT procedure using union-beam 405 may thus ensure the medium is clear in directions to be used for transmission of directional DRS 310-a, 310-b, 310-c, 310-d, 310-e, and 310-f (e.g., multi-beam DRS 315-a). Base station 105-c may perform a union-beam LBT procedure during LBT gap 410-a (e.g., using union-beam 405). If successful, base station 105-c may subsequently transmit a filler signal 415-a via union-beam 405 (e.g., a pseudo-omnidirectional reservation signal) to reserve the medium over which each directional DRS 310 symbol within multi-beam DRS 315-a will be transmitted. Base station 105-c may then transmit multi-beam DRS 315-a.

Figure 5:
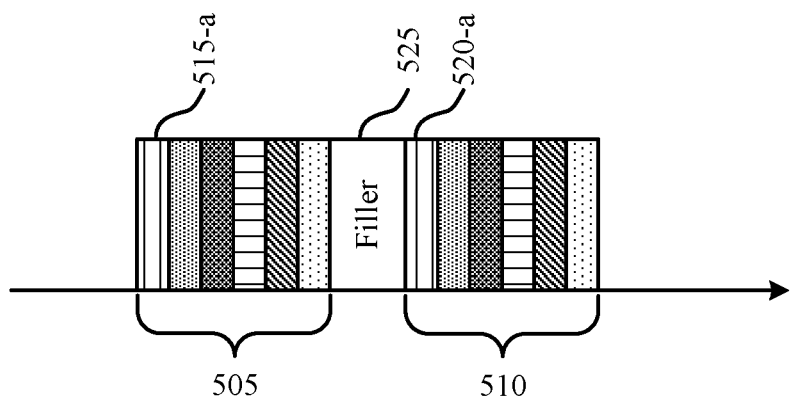
FIGS. 5 through 7 illustrates an example of a transmission timeline that supports multi-beam and single-beam discovery reference signals (DRS) for shared spectrum in accordance with aspects of the present disclosure.

FIG. 5 illustrates a transmission timeline 500 that supports guaranteed/semi-guaranteed and/or opportunistic transmission of multi-beam and single-beam reference signals (e.g., DRS) for shared spectrum in accordance with various aspects of the present disclosure. Timeline 500 illustrates directional LBT procedures being performed sequentially during an LBT gap 505 for transmission of a multi-beam DRS 510. The transmission beam or direction associated with the directional LBT procedure may correspond to a directional DRS transmission within the multi-beam DRS 510. For example, a directional LBT 515-a may be performed for a transmission beam associated with directional DRS 520-a. In some cases, a pseudo-omnidirectional reservation signal such as filler signal 525 may be transmitted after the last directional LBT to reserve the medium over all transmission beams or directions deemed clear by the directional LBT procedures. In some examples, directional DRSs 520 associated with an unsuccessful directional LBT may not be transmitted, as the corresponding transmission beam or direction may not be clear for transmissions.

Figure 6:
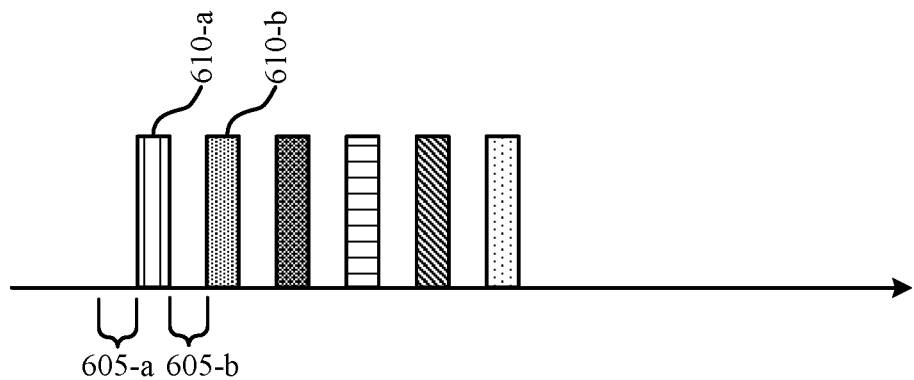

FIG. 6 illustrates timeline 600 that supports guaranteed/semi-guaranteed and/or opportunistic transmission of multi-beam and single-beam reference signals (e.g., DRS) for shared spectrum in accordance with various aspects of the present disclosure. Timeline 600 shows an example of interleaved LBT for multi-beam DRS. As shown, gaps 605 may be introduced between each DRS symbol to enable directional LBT procedures to be performed prior to each directional DRS 610 transmission. For example, a gap 605-a may be introduced before directional DRS 610-a, a gap 605-b may be introduced before directional DRS 610-b, and so on. During gap 605-a, a directional LBT procedure may be performed for a transmission beam associated with directional DRS 610-a.

The gaps 605 may be introduced either at the beginning or end of each DRS symbol. Directional DRS 610 transmissions may only be conducted when a successful directional LBT procedure has been performed, in the corresponding gap 605, for the transmission beam to be used for the directional DRS 610. As an example, a DRS symbol may be 17.89 µs and composed of four symbols, each of ~4.5 µs (e.g., as in NR mmW DRS). One of the four symbols may be used for LBT in the NR-shared spectrum (NR-SS) design. As such, LBT gaps and DRS transmissions may be interleaved with each other.

Figure 7:
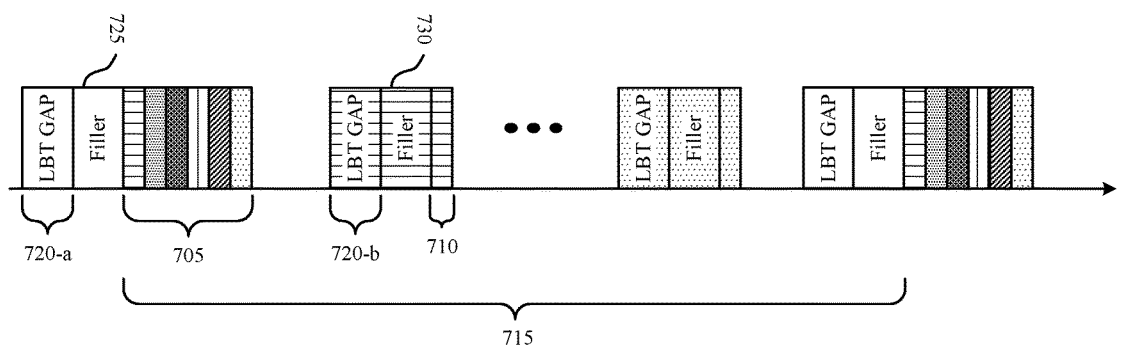

FIG. 7 illustrates an example of a timeline 700 that supports guaranteed/semi-guaranteed and/or opportunistic transmission of multi-beam and single-beam reference signals (e.g., DRS) for shared spectrum in accordance with various aspects of the present disclosure. Timeline 700 shows transmission of multi-beam DRS 705 in addition to single-beam DRS 710. During an inter-DRS interval 715, instances of single-beam DRS 710 may be transmitted in addition or independently from the multi-beam DRS 705. Single-beam DRS 710 may be an independent DRS transmission utilizing only one transmission beam and the beam width may be determined by a base station 105 performing the transmission. As discussed with reference to FIG. 4, a pseudo-omnidirectional LBT may be performed during an LBT gap 720-a, followed by a pseudo-omnidirectional filler signal 725 (e.g., a channel reservation signal), prior to transmission of multi-beam DRS 705 (e.g., dependent on a successful pseudo-omnidirectional LBT).

In the present example, after the multi-beam DRS 705, a directional LBT may be performed in LBT gap 720-b. If the directional LBT during LBT gap 720-b is successful, a directional filler signal 730 (e.g., a channel reservation signal in the direction of the transmission beam) may be transmitted to reserve the medium associated with single-beam DRS 710. As such, one or more DRS transmissions corresponding to DRS transmissions within multi-beam DRS 705 may be transmitted opportunistically (pending a successful directional LBT) over a corresponding transmission beam within single-beam DRS 710 during the inter-DRS interval 715. In some cases, single-beam DRS 710 may be associated with a different priority class than the multi-beam DRS 705 (e.g., which may be the same as or higher than regular traffic). In some cases, the transmission beam over which single-beam DRS 710 is transmitted may be the same as a beam within multi-beam DRS 705. For example, as shown, single-beam DRS 710 is the same transmission beam as the first transmission beam of the multi-beam DRS 705.

Figure 8:
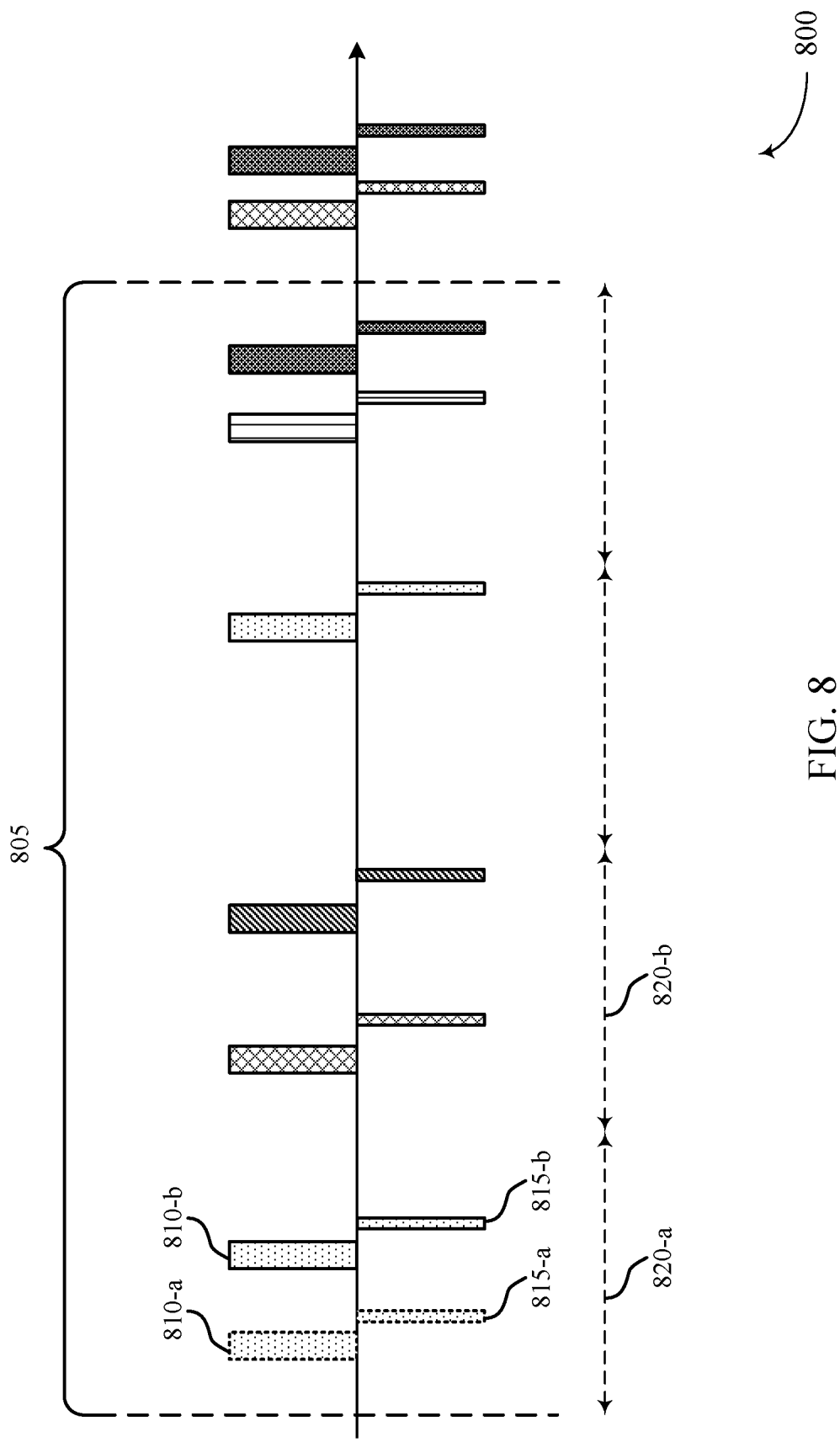
FIG. 8 illustrates an example of a transmission timeline that supports staggered multi-beam and single-beam discovery reference signals (DRS) for shared spectrum in accordance with aspects of the present disclosure.

FIG. 8 illustrates an example of a timeline 800 that supports staggered guaranteed/semi-guaranteed and/or opportunistic transmission of multi-beam and single-beam reference signals (e.g., DRS) for shared spectrum in accordance with various aspects of the present disclosure. In some cases, single-beam DRSs 810 may be transmitted in a staggered fashion as shown on timeline 800. Uplink random access channel (RACH) opportunities 815 may correspond to respective single-beam DRSs 810 and may be indicated through via an SS block of single-beam DRS 810. In some cases, single-beam DRS 810 may indicate multiple RACH opportunities 815. Duration 805 may illustrate a DRS repetition periodicity spanning multiple SS bursts, each of which may contain one or more SS blocks.

In the present example, single-beam DRS 810 may be staggered with system frame number (SFN) and subframe (e.g., {SFN, SF}) timing indicated in DRS (e.g., within the PBCH of an SS block). Each staggered single-beam DRS 810 may occur during a window based on LBT success. Subframe/SF timing may be resolved by DRS transmission. For example, PBCH signaling in combination with either a signature in the SSS short code or additional layer 1 signaling may resolve subframe/SF timing. In the case of floating DRS, subframe/SF timing may still be resolved. A window may be allocated for each SS block to minimize PBCH signaling. Duration 805 may include a period corresponding to four SS bursts (e.g., 40, 80, 160 ms). Each DRS instance may be spaced (e.g., by n*250 µs). In some cases, PSS/SSS may be combined within DRS.

In one example, an LBT procedure may be performed in a given direction prior to single-beam DRS 810-a within a first DRS interval 820-a. If the LBT procedure is successful, single-beam DRS 810-a is transmitted and may indicate a corresponding RACH opportunity 815-a. The LBT procedure may be performed at the beginning of interval 820-a, which may be allocated for DRS transmission. The LBT procedure may span multiple symbols and in some cases, a base station 105 may listen for an opportunity to transmit (e.g., a clear medium) a DRS. In some cases, the base station 105 may reach the end of the interval 820-*a* without a successful LBT procedure and thus, may not transmit DRS 810-*a*.

In some cases, the base station may perform another LBT procedure within interval 820-*a* if a first LBT procedure fails. Upon a successful LBT, the base station 105 may transmit single-beam DRS 810-*b* indicating a RACH opportunity 815-*b*. For example, single-beam DRS 810 may be staggered across time, subject to LBT, such that multiple directions may be spanned as the LBT associated with each direction succeeds over time.

If the LBT procedure fails in the given direction, the single-beam DRS 810 may not be transmitted and instead a second LBT procedure may be performed in a subsequent window (e.g., interval 820-*b*) allocated for single-beam DRS. The second LBT procedure may be performed in the same direction as single-beam DRS 810 or in a different direction. For instance, multiple time windows may correspond to respective single-beam DRS directions. As such, DRS in one direction may only be transmitted within a given interval 820. Alternatively, multiple directions may be supported for a given interval 820.

Due to the varying time windows and respective DRS directions for a given window, the opportunity for transmitting a DRS may be staggered. For instance, due to one or more unsuccessful LBT procedures in one or more directions, DRSs in the corresponding directions may not be transmitted. In some examples, the intervals allocated for DRS may vary and instead of having windows periodically allocated for DRS, the windows may be staggered and thus, even upon successful LBT procedures in multiple directions, the DRS transmission may not be periodic.

Figure 9:
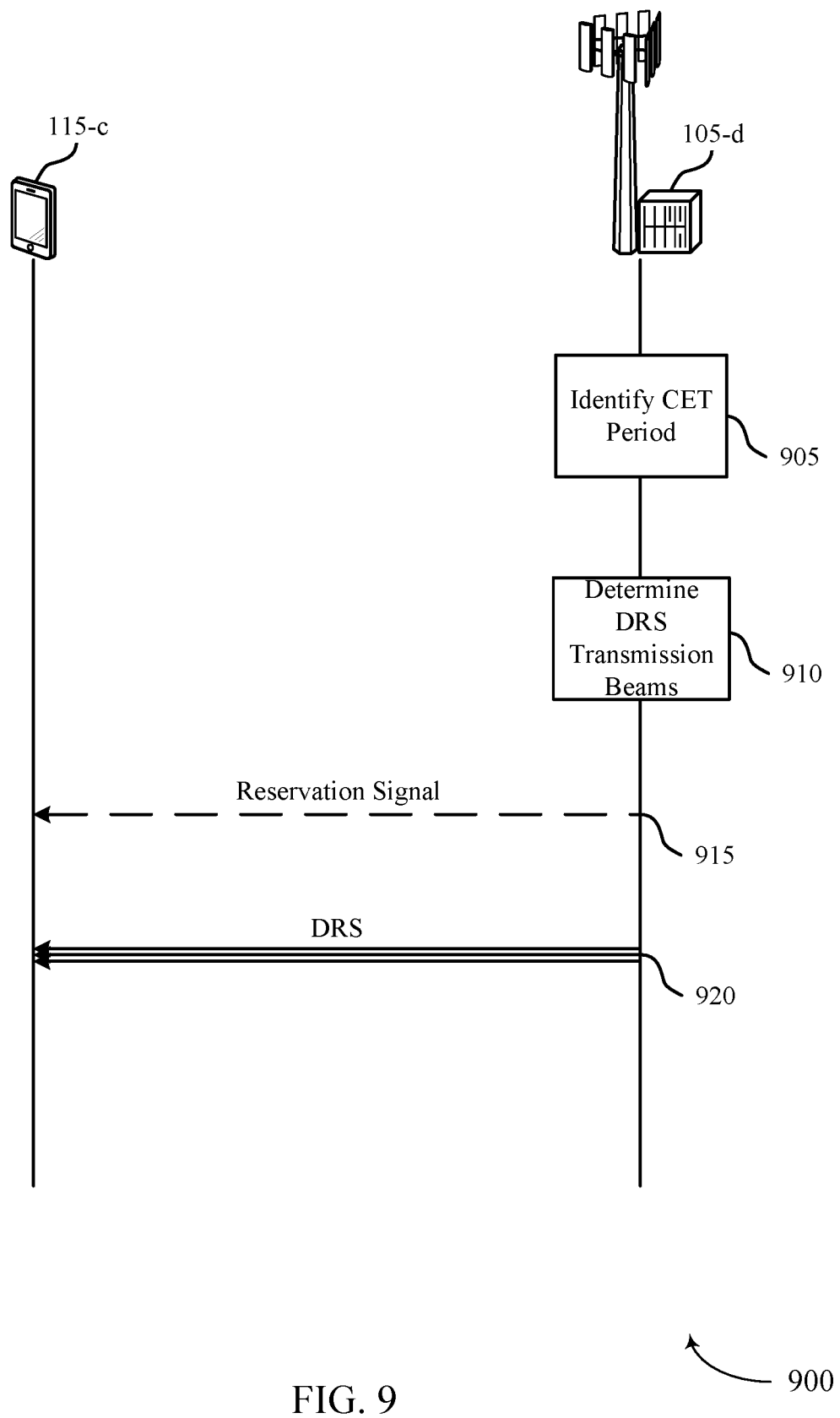
FIGS. 9 and 10 illustrate examples of process flows that support multi-beam and single-beam discovery reference signals (DRS) for shared spectrum in accordance with aspects of the present disclosure.

FIG. 9 illustrates an example of a process flow 900 that supports multi-beam and opportunistic reference signals (e.g., DRS) for shared spectrum in accordance with various aspects of the present disclosure. Process flow 900 may include a UE 115-*c*, and a base station 105-*d*, which may be examples of the corresponding devices described with reference to FIGS. 1-4.

At 905, base station 105-*d* may identify a CET period for a shared radio frequency spectrum band. The CET period may correspond to a period where the base station 105-*d* does not perform an LBT prior to transmission of a DRS. At 910, base station 105-*d* may then determine transmission beams for transmission of DRS over the shared spectrum.

At 915, base station 105-*d* may optionally transmit a reservation signal (e.g., filler signal) to UE 115-*c* (and other UEs of the system) indicating that the medium is reserved. In some cases, the reservation signal may be transmitted over the union of the transmission beams determined at 910. The reservation signal may indicate that at least a portion (e.g., the portion to be covered by the DRS transmission beams) of the shared spectrum is reserved for a predetermined amount of time.

At 920, base station 105-*d* may transmit the DRS using the multiple transmission (e.g., determined at 910) beams during the CET period identified at 905. In some cases, the DRS may be transmitted periodically at fixed intervals. The fixed intervals may be based on a duty cycle associated with the DRS transmission.

Figure 10:
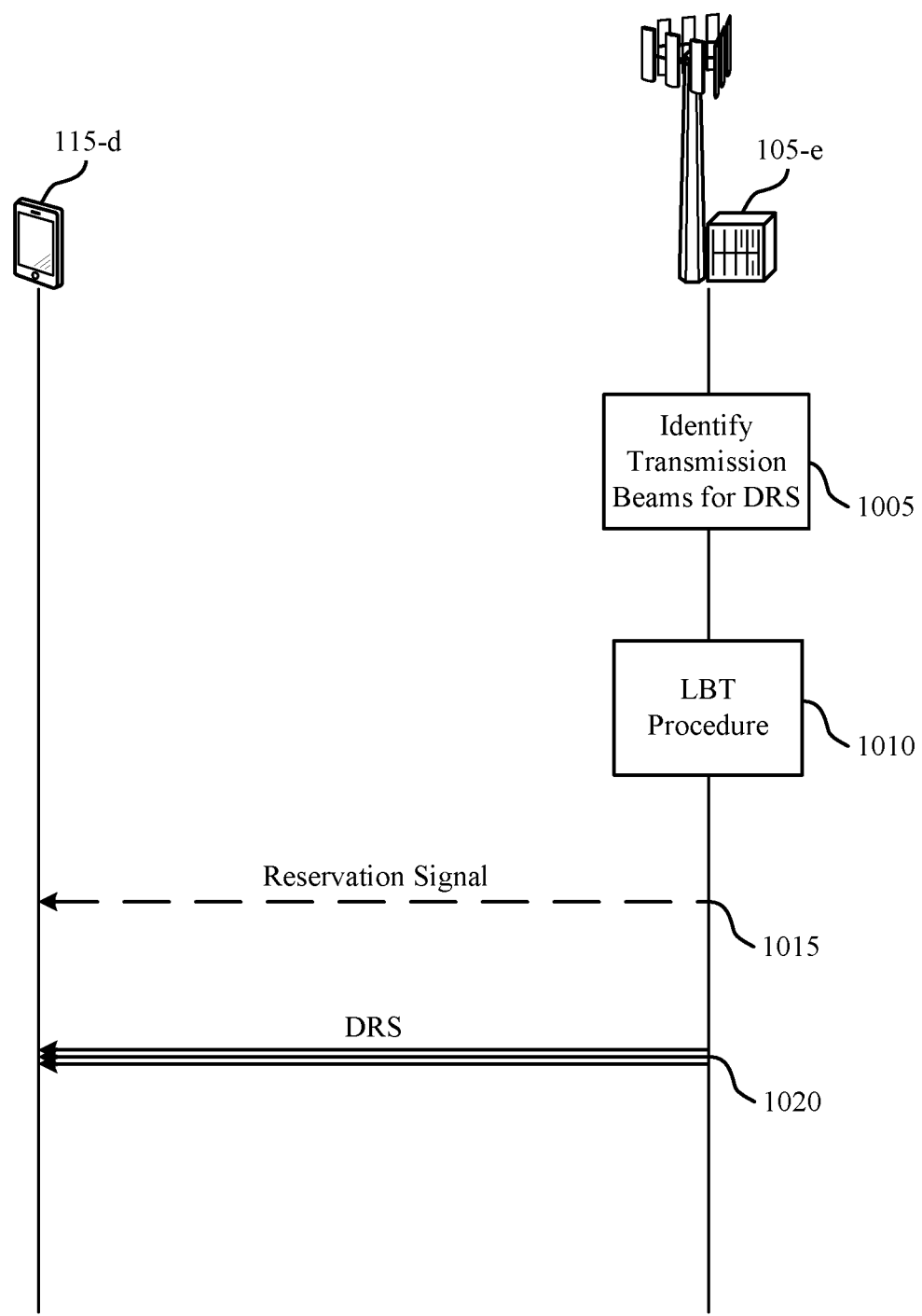

FIG. 10 illustrates an example of a process flow that supports multi-beam and opportunistic reference signals (e.g., DRS) for shared spectrum in accordance with various aspects of the present disclosure. Process flow 1000 may include a UE 115-*d*, and a base station 105-*e*, which may be examples of the corresponding devices described with reference to FIG. 1-4.

At 1005, base station 105-*e* may identify multiple transmission beams for DRS transmission over the shared spectrum. In some cases, gap intervals preceding each identified transmission beam may be additionally be identified. In some cases, base station 105-*e* may receive a DRS initiation request from UE 115-*d* initiating step 1005 (e.g., initiating opportunistic DRS).

At 1010, base station 105-*e* may perform an LBT procedure for the DRS based on the multiple transmission beams identified at 1005. In some cases, LBT procedures may be performed for each transmission beam. In other cases, the LBT may be performed over a union of the multiple transmission beams. The LBT procedure may include an energy sensing LBT procedure. Alternatively, the LBT procedure may include receiving a channel reservation signal on each of the multiple transmission beams and sensing energy over the multiple transmission beams. In the case where gap intervals are identified before each DRS transmission beam, a beam-specific LBT procedure may be performed in each gap interval preceding the DRS transmissions.

At 1015, base station 105-*e* may optionally transmit a reservation signal (e.g., filler signal) to UE 115-*d* (and other UEs of the system) indicating that the medium is reserved. In some cases, the reservation signal may be transmitted based on the success of the LBT procedure performed in 1010, and may be transmitted over the union of the multiple transmission beams. The reservation signal may indicate that at least a portion of the shared spectrum is reserved for a predetermined time.

At 1020, base station 105-*e* may transmit the DRS using a set of the multiple transmission beams identified at 1005. The set of transmission beams used for DRS transmission may depend on the success of the LBT procedures performed at 1010. That is, the DRS may be transmitted on each transmission beam corresponding to a successful LBT procedure. In some cases, DRS may be transmitted opportunistically as discussed with respect to FIG. 7. Opportunistic DRS may include a BRS, PSS, SSS, and/or a PBCH message. In some cases, single-beam DRS may be transmitted periodically within a floating time window. In some cases, the time window may follow the reception of an initiation request from a UE (e.g., UE 115-*d*).

Figure 11:
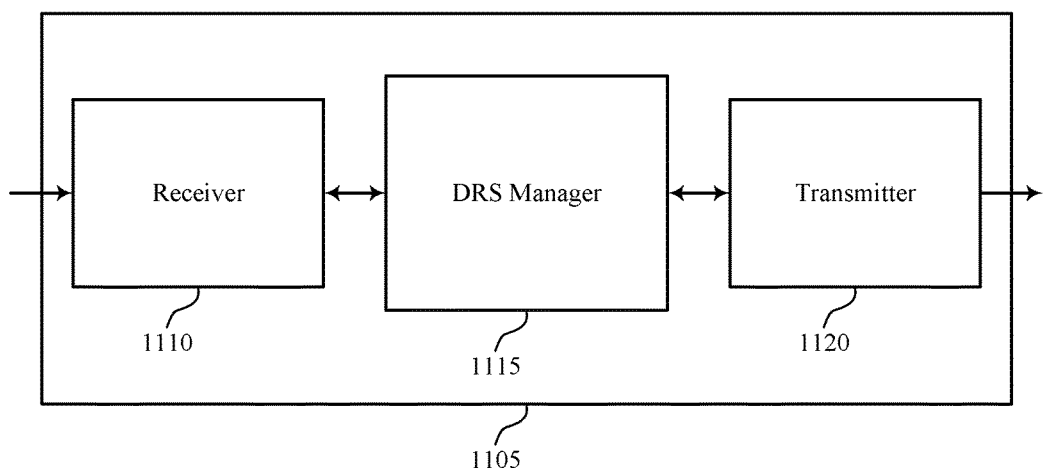
FIGS. 11 through 13 show block diagrams of a device that supports multi-beam and single-beam discovery reference signals (DRS) for shared spectrum in accordance with aspects of the present disclosure.

FIG. 11 shows a block diagram 1100 of a wireless device 1105 that supports multi-beam and opportunistic reference signals (e.g., DRS) for shared spectrum in accordance with various aspects of the present disclosure. Wireless device 1105 may be an example of aspects of a base station 105 as described with reference to FIG. 1. wireless device 1105 may include receiver 1110, DRS manager 1115, and transmitter 1120. wireless device 1105 may also include a processor. Each of these components may be in communication with one another (e.g., via one or more buses).

Receiver 1110 may receive information such as packets, user data, or control information associated with various information channels (e.g., control channels, data channels, and information related to guaranteed/semi-guaranteed and/or opportunistic transmission of multi-beam and single-beam reference signals (e.g., DRS) for shared spectrum, etc.). Information may be passed on to other components of the device. The receiver 1110 may be an example of aspects of the transceiver 1435 described with reference to FIG. 14.

DRS manager 1115 may be an example of aspects of the DRS manager 1415 described with reference to FIG. 14. DRS manager 1115 and/or at least some of its various sub-components may be implemented in hardware, software executed by a processor, firmware, or any combination thereof. If implemented in software executed by a processor, the functions of the DRS manager 1115 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The DRS manager 1115 and/or at least some of its various sub-components may be physically located at various positions, including being distributed such that portions of functions are implemented at different physical locations by one or more physical devices. In some examples, DRS manager 1115 and/or at least some of its various sub-components may be a separate and distinct component in accordance with various aspects of the present disclosure. In other examples, DRS manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

DRS manager 1115 may determine a CET period for a shared radio frequency spectrum band, determine multiple transmission beams for transmission of a DRS over the shared radio frequency spectrum band, and transmit, over the shared radio frequency spectrum band, the DRS using the multiple transmission beams during CET period. The DRS manager 1115 may also determine multiple transmission beams for transmission of a DRS over a shared radio frequency spectrum band, perform a listen before talk LBT procedure for the DRS based on the multiple transmission beams, and transmit, based on the LBT procedure, the DRS over the shared radio frequency spectrum band using a set of the multiple transmission beams.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
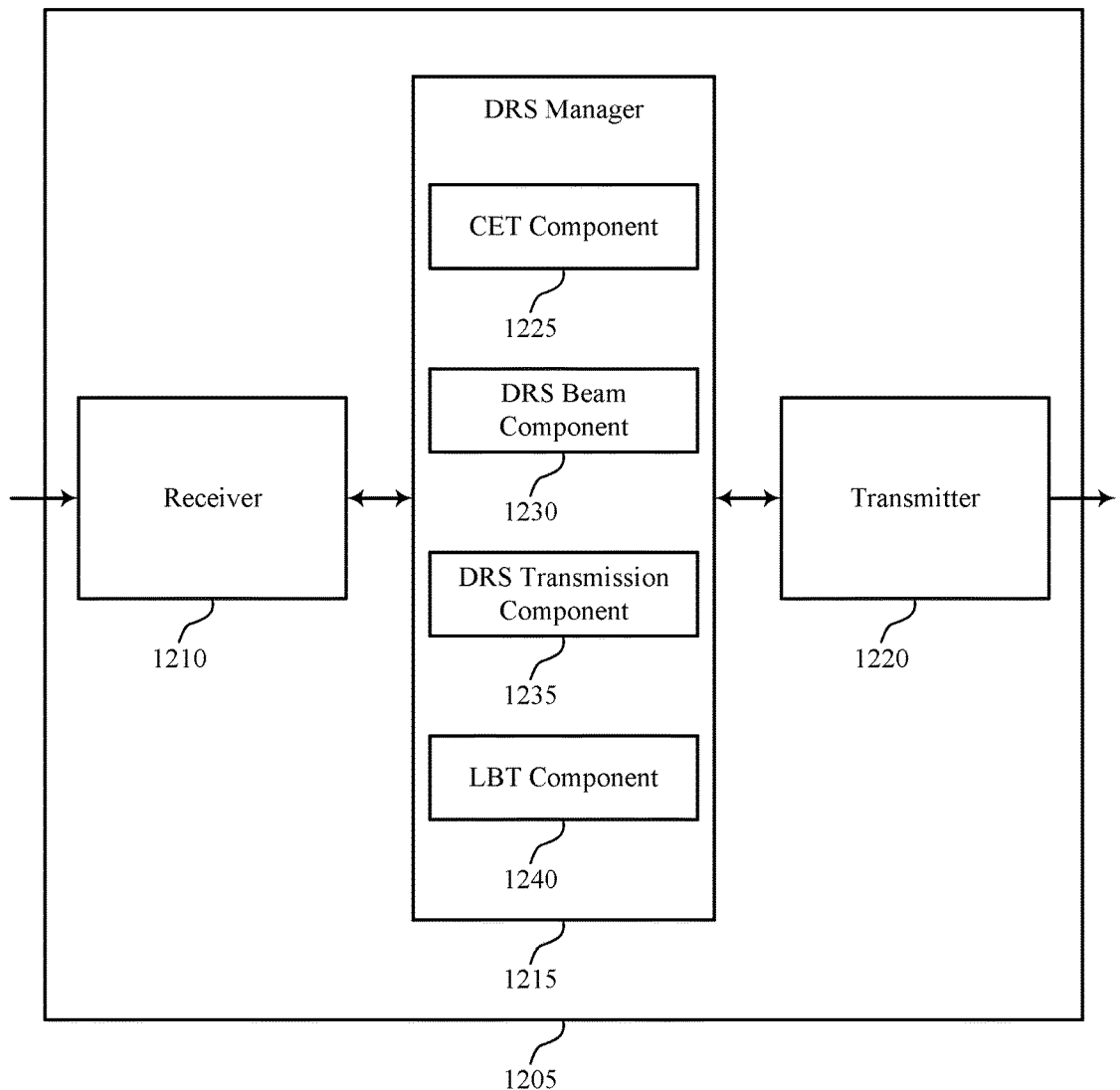

FIG. 12 shows a block diagram 1200 of a wireless device 1205 that supports multi-beam and opportunistic reference signals (e.g., DRS) for shared spectrum in accordance with various aspects of the present disclosure. Wireless device 1205 may be an example of aspects of a wireless device 1105 or a base station 105 as described with reference to FIGS. 1 and 11. wireless device 1205 may include receiver 1210, DRS manager 1215, and transmitter 1220. wireless device 1205 may also include a processor. Each of these components may be in communication with one another (e.g., via one or more buses).

Receiver 1210 may receive information such as packets, user data, or control information associated with various information channels (e.g., control channels, data channels, and information related to guaranteed/semi-guaranteed and/or opportunistic transmission of multi-beam and single-beam reference signals (e.g., DRS) for shared spectrum, etc.). Information may be passed on to other components of the device. The receiver 1210 may be an example of aspects of the transceiver 1435 described with reference to FIG. 14.

DRS manager 1215 may be an example of aspects of the DRS manager 1415 described with reference to FIG. 14. DRS manager 1215 may also include CET component 1225, DRS beam component 1230, DRS transmission component 1235, and LBT component 1240. CET component 1225 may determine a CET period for a shared radio frequency spectrum band.

DRS beam component 1230 may determine multiple transmission beams for transmission of a DRS over the shared radio frequency spectrum band, determine multiple transmission beams for transmission of a DRS over a shared radio frequency spectrum band, and determine the set of multiple transmission beams based on a success of the LBT procedure for at least one of the multiple transmission beams. In some cases, a priority class associated with the opportunistic DRS on the first beam is different from a priority class associated with the DRS on a corresponding beam of the multiple transmission beams. In some cases, the transmission of the opportunistic DRS on the first beam spans more symbols than a transmission of the DRS on a corresponding beam of the multiple transmission beams. In some cases, the opportunistic DRS on the first beam includes more SS blocks than the DRS on a corresponding beam of the multiple transmission beams.

DRS transmission component 1235 may transmit, over the shared radio frequency spectrum band, the DRS using the multiple transmission beams during CET period, transmit a single-beam DRS on each beam of the multiple transmission beams associated with a successful opportunistic beam-specific LBT procedure, and transmit, based on the LBT procedure, the DRS over the shared radio frequency spectrum band using a set of the multiple transmission beams. The DRS transmission component 1235 may determine the set of the multiple transmission beams based on a success of the beam-specific LBT procedure for at least one of the multiple beams, transmit an opportunistic DRS on the first beam based on a success of the opportunistic beam-specific LBT procedure for the first beam, and transmit the opportunistic DRS based on the received DRS initiation request. In some cases, transmitting the DRS includes: transmitting the DRS on each transmission beam corresponding to a successful LBT procedure. In some cases, transmitting the DRS includes: periodically transmitting the DRS over the shared radio frequency spectrum band at fixed intervals. In some cases, the opportunistic DRS includes at least one of a BRS, a PSS, an SSS, a PBCH message, or any combination thereof. In some cases, a single-beam DRS is transmitted periodically within a floating time window. In some cases, the single-beam DRS is transmitted within a time window after reception of the DRS initiation request. In some cases, the opportunistic beam-specific LBT procedure is performed in a direction corresponding to the first beam.

LBT component 1240 may perform an LBT procedure for the DRS based on the multiple transmission beams. In some cases, performing the LBT procedure includes one or both of: receiving a channel reservation signal on each of the multiple transmission beams and sensing energy over at least one of the multiple transmission beams. LBT component 1240 may perform a beam-specific LBT procedure for each beam in respective gap intervals, perform an opportunistic beam-specific LBT procedure for a first beam of the multiple transmission beams, and perform an opportunistic beam-specific LBT procedure for each beam of the multiple transmission beams. In some cases, performing the LBT procedure includes: performing the LBT procedure over a union of the multiple transmission beams. In some cases, the LBT procedure includes an energy sensing LBT procedure.

In some cases, performing the LBT procedure includes: performing the LBT procedure over each of the multiple transmission beams prior to transmission of the DRS.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
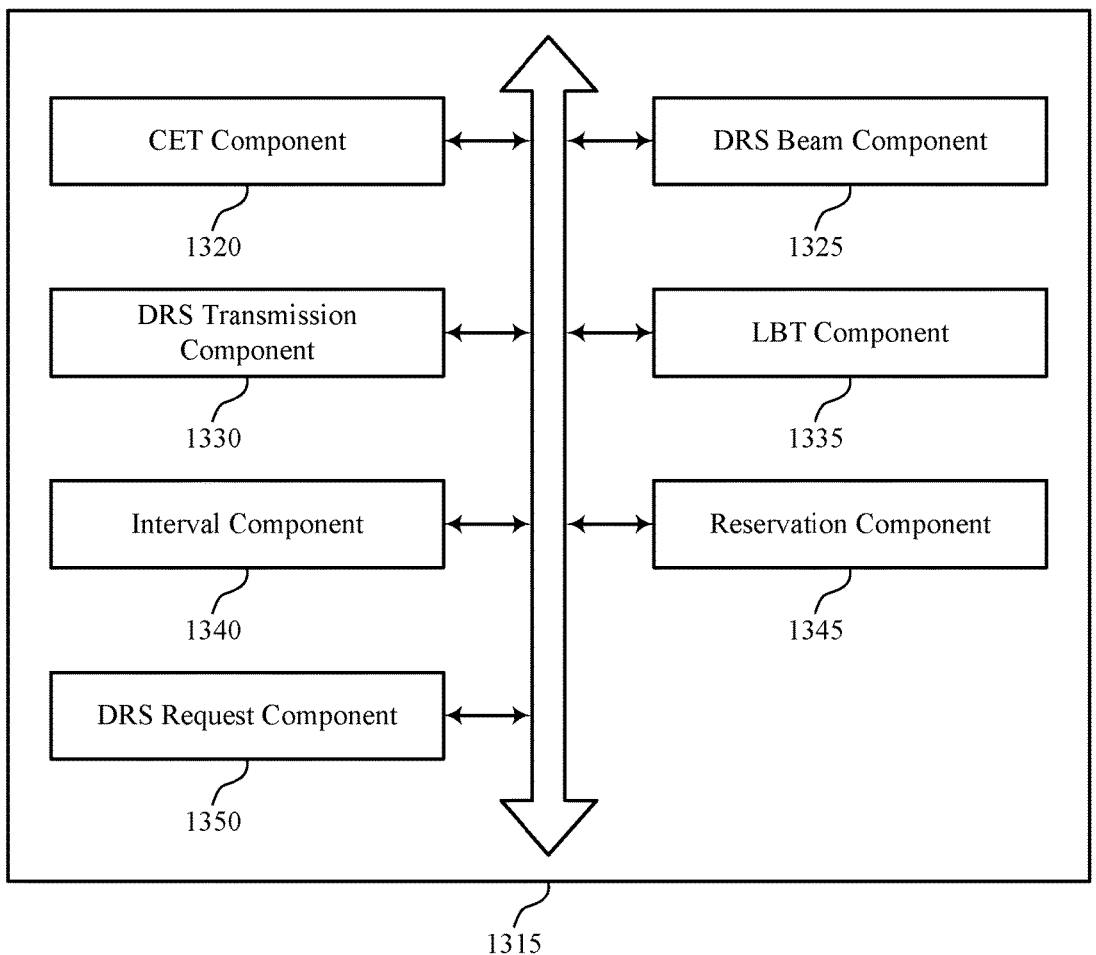

FIG. 13 shows a block diagram 1300 of a DRS manager 1315 that supports multi-beam and opportunistic reference signals (e.g., DRS) for shared spectrum in accordance with various aspects of the present disclosure. The DRS manager 1315 may be an example of aspects of a DRS manager 1115, a DRS manager 1215, or a DRS manager 1415 described with reference to FIGS. 11, 12, and 14. The DRS manager 1315 may include CET component 1320, DRS beam component 1325, DRS transmission component 1330, LBT component 1335, interval component 1340, reservation component 1345, and DRS request component 1350. Each of these modules may communicate, directly or indirectly, with one another (e.g., via one or more buses).

CET component 1320 may determine a CET period for a shared radio frequency spectrum band. DRS beam component 1325 may determine multiple transmission beams for transmission of a DRS over the shared radio frequency spectrum band, determine multiple transmission beams for transmission of a DRS over a shared radio frequency spectrum band, and determine the set of multiple transmission beams based on a success of the LBT procedure for at least one of the multiple transmission beams. In some cases, a priority class associated with the opportunistic DRS on the first beam is different from a priority class associated with the DRS on a corresponding beam of the multiple transmission beams. In some cases, the transmission of the opportunistic DRS on the first beam spans more symbols than a transmission of the DRS on a corresponding beam of the multiple transmission beams. In some cases, the opportunistic DRS on the first beam includes more SS blocks than the DRS on a corresponding beam of the multiple transmission beams.

DRS transmission component 1330 may transmit, over the shared radio frequency spectrum band, the DRS using the multiple transmission beams during CET period, transmit an opportunistic DRS on each beam of the multiple transmission beams associated with a successful opportunistic beam-specific LBT procedure, and transmit, based on the LBT procedure, the DRS over the shared radio frequency spectrum band using a set of the multiple transmission beams. The DRS transmission component 1330 may determine the set of the multiple transmission beams based on a success of the beam-specific LBT procedure for at least one of the multiple beams, transmit an opportunistic DRS on the first beam based on a success of the opportunistic beam-specific LBT procedure for the first beam, and transmit the opportunistic DRS based on the received DRS initiation request. In some cases, transmitting the DRS includes: transmitting the DRS on each transmission beam corresponding to a successful LBT procedure. In some cases, transmitting the DRS includes: periodically transmitting the DRS over the shared radio frequency spectrum band at fixed intervals. In some cases, the opportunistic DRS includes at least one of a BRS, a PSS, an SSS, a PBCH message, or any combination thereof. In some cases, a single-beam DRS is transmitted periodically within a floating time window. In some cases, the opportunistic DRS is transmitted within a time window after reception of the DRS initiation request. In some cases, the opportunistic beam-specific LBT procedure is performed in a direction corresponding to the first beam.

LBT component 1335 may perform an LBT procedure for the DRS based on the multiple transmission beams. In some cases, performing the LBT procedure includes one or both of: receiving a channel reservation signal on each of the multiple transmission beams, and sensing energy over at least one of the multiple transmission beams. LBT component 1335 may perform a beam-specific LBT procedure for each beam in respective gap intervals, perform an opportunistic beam-specific LBT procedure for a first beam of the multiple transmission beams, and perform an opportunistic beam-specific LBT procedure for each beam of the multiple transmission beams. In some cases, performing the LBT procedure includes: performing the LBT procedure over a union of the multiple transmission beams. In some cases, the LBT procedure includes an energy sensing LBT procedure. In some cases, performing the LBT procedure includes: performing the LBT procedure over each of the multiple transmission beams prior to transmission of the DRS.

Interval component 1340 may determine the fixed intervals based on a duty cycle associated with transmission of the DRS, identify gap intervals preceding each beam of the multiple transmission beams, and stagger a time interval between a first opportunistic beam-specific LBT procedure and a second opportunistic beam-specific LBT procedure within a time window. In some cases, the staggering is based on a success of the first or the second opportunistic beam-specific LBT procedure.

Reservation component 1345 may transmit, prior to transmission of the DRS, a reservation signal over a union of the multiple transmission beams, and transmit, prior to transmission of the opportunistic DRS, a reservation signal in a direction corresponding to the first beam. In some cases, the reservation signal indicates that at least a portion of the shared radio frequency spectrum band is reserved. DRS request component 1350 may receive a DRS initiation request from a UE.

Figure 14:
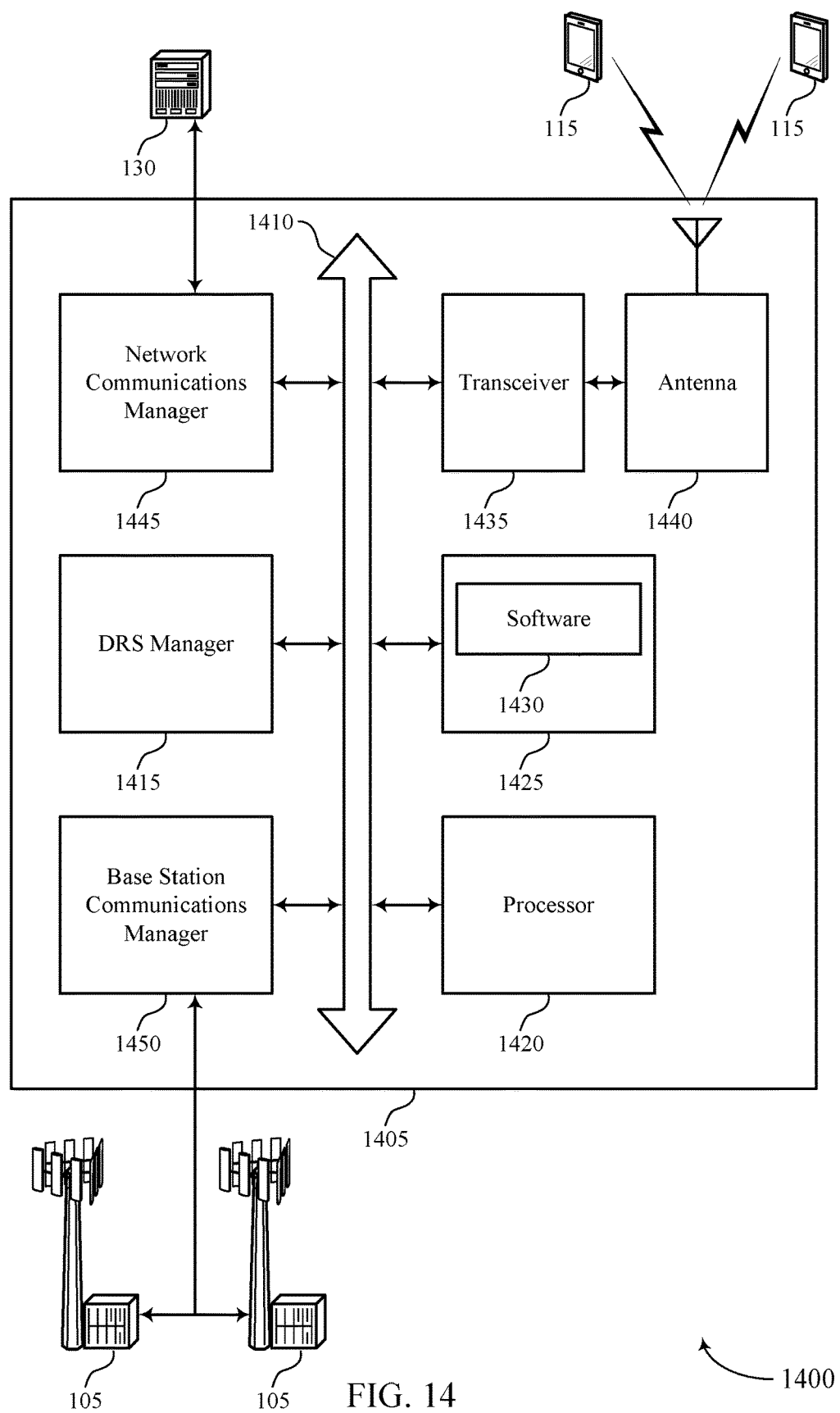
FIG. 14 illustrates a block diagram of a system including a base station that supports multi-beam and single-beam discovery reference signals (DRS) for shared spectrum in accordance with aspects of the present disclosure.

FIG. 14 shows a diagram of a system 1400 including a device 1405 that supports multi-beam and opportunistic reference signals (e.g., DRS) for shared spectrum in accordance with various aspects of the present disclosure. Device 1405 may be an example of or include the components of wireless device 1105, wireless device 1205, or a base station 105 as described above, e.g., with reference to FIGS. 1, 11 and 12. Device 1405 may include components for bi-directional voice and data communications including components for transmitting and receiving communications, including DRS manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting guaranteed/semi-guaranteed and/or opportunistic transmission of multi-beam and single-beam reference signals (e.g., DRS) for shared spectrum).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware and/or software operation such as the interaction with peripheral components or devices.

Software 1430 may include code to implement aspects of the present disclosure, including code to support guaranteed/semi-guaranteed and/or opportunistic transmission of multi-beam and single-beam reference signals (e.g., DRS) for shared spectrum. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an LTE/LTE-A wireless communication network technology to provide communication between base stations 105.

Figure 15:
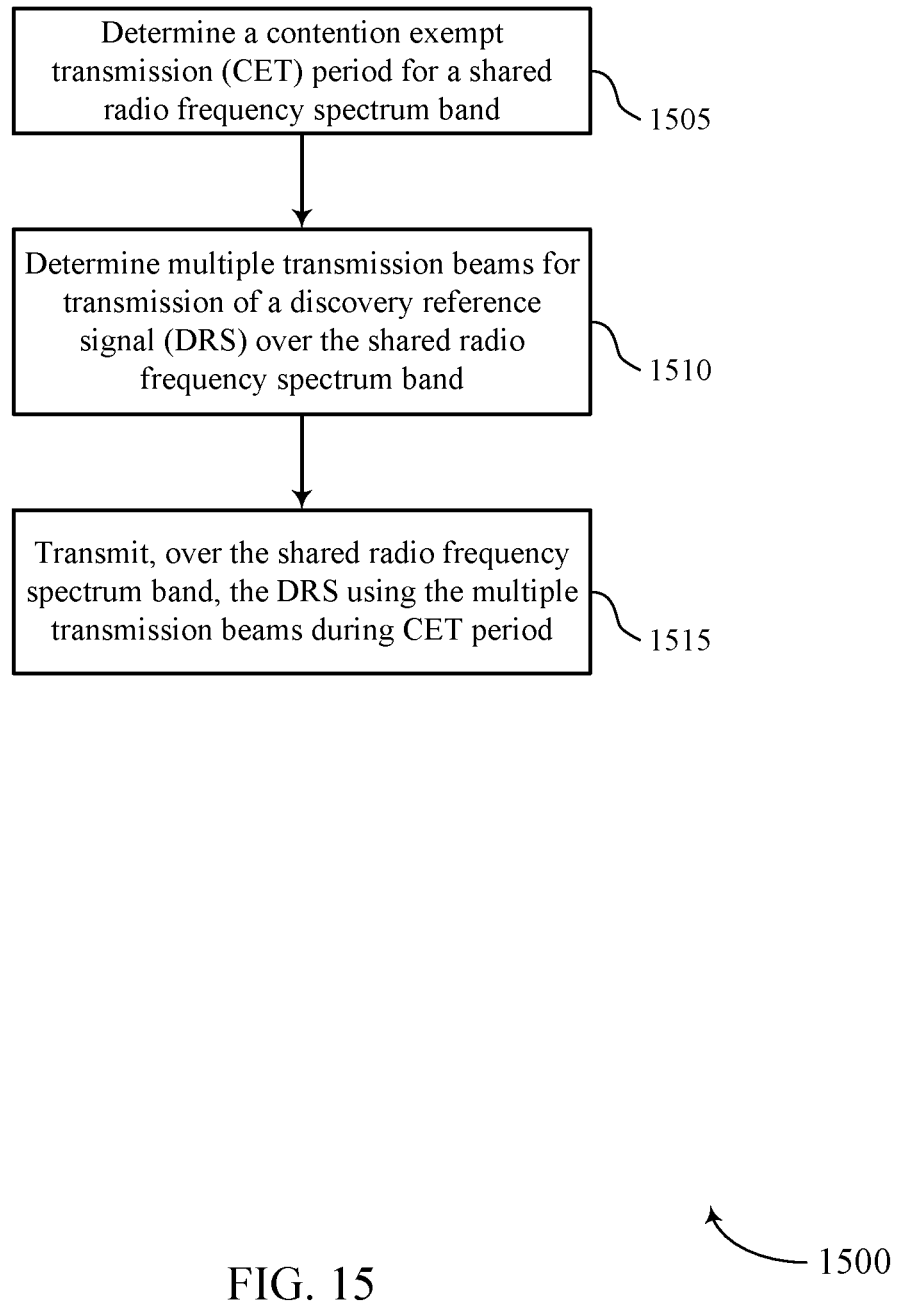
FIGS. 15 through 16 illustrate methods multi-beam and single-beam discovery reference signals (DRS) for shared spectrum in accordance with aspects of the present disclosure.

FIG. 15 shows a flowchart illustrating a method 1500 for multi-beam and opportunistic reference signals (e.g., DRS) for shared spectrum in accordance with various aspects of the present disclosure. The operations of method 1500 may be implemented by a base station 105 or its components as described herein. For example, the operations of method 1500 may be performed by a DRS manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may determine a CET period for a shared radio frequency spectrum band. The operations of block 1505 may be performed according to the methods described with reference to FIGS. 1 through 10. In certain examples, aspects of the operations of block 1505 may be performed by a CET component as described with reference to FIGS. 11 through 14.

At block 1510 the base station 105 may determine multiple transmission beams for transmission of a DRS over the shared radio frequency spectrum band. The operations of block 1510 may be performed according to the methods described with reference to FIGS. 1 through 10. In certain examples, aspects of the operations of block 1510 may be performed by a DRS beam component as described with reference to FIGS. 11 through 14.

At block 1515 the base station 105 may transmit, over the shared radio frequency spectrum band, the DRS using the multiple transmission beams during CET period. The operations of block 1515 may be performed according to the methods described with reference to FIGS. 1 through 10. In certain examples, aspects of the operations of block 1515 may be performed by a DRS transmission component as described with reference to FIGS. 11 through 14, which may operate in cooperation with a transmitter 1120 or 1220 as described with reference to FIG. 11 or 12, or antenna(s) 1440 and transceiver(s) 1435 as described with reference to FIG. 14.

Figure 16:
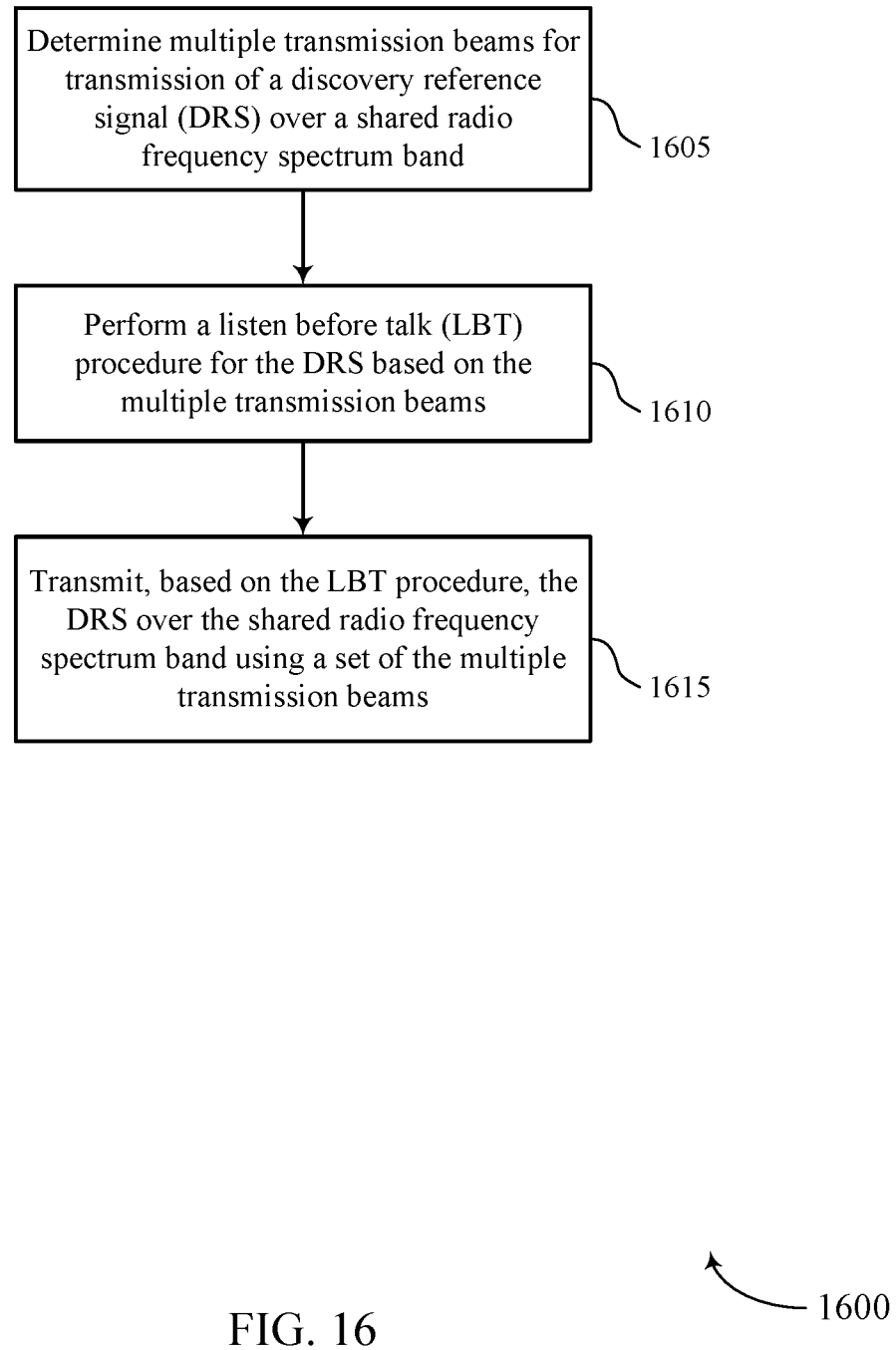

FIG. 16 shows a flowchart illustrating a method 1600 for guaranteed/semi-guaranteed and/or opportunistic transmission of multi-beam and single-beam reference signals (e.g., DRS) for shared spectrum in accordance with various aspects of the present disclosure. The operations of method 1600 may be implemented by a base station 105 or its components as described herein. For example, the operations of method 1600 may be performed by a DRS manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may determine multiple transmission beams for transmission of a DRS over a shared radio frequency spectrum band. The operations of block 1605 may be performed according to the methods described with reference to FIGS. 1 through 10. In certain examples, aspects of the operations of block 1605 may be performed by a DRS beam component as described with reference to FIGS. 11 through 14.

At block 1610 the base station 105 may perform an LBT procedure for the DRS based at least in part on the multiple transmission beams. The operations of block 1610 may be performed according to the methods described with reference to FIGS. 1 through 10. In certain examples, aspects of the operations of block 1610 may be performed by an LBT component as described with reference to FIGS. 11 through 14.

At block 1615 the base station 105 may transmit, based at least in part on the LBT procedure, the DRS over the shared radio frequency spectrum band using a set of the multiple transmission beams. The operations of block 1615 may be performed according to the methods described with reference to FIGS. 1 through 10. In certain examples, aspects of the operations of block 1615 may be performed by a DRS transmission component as described with reference to FIGS. 11 through 14, which may operate in cooperation with a transmitter 1120 or 1220 as described with reference to FIG. 11 or 12, or antenna(s) 1440 and transceiver(s) 1435 as described with reference to FIG. 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   determining multiple transmission beams for transmission of a discovery reference signal (DRS) over a shared radio frequency spectrum band;
   performing a first listen before talk (LBT) procedure for the DRS based at least in part on the multiple transmission beams;
   transmitting, based at least in part on the first LBT procedure, the DRS over the shared radio frequency spectrum band using a set of the multiple transmission beams;
   performing an opportunistic beam-specific second LBT procedure for a first beam of the multiple transmission beams; and
   transmitting an opportunistic DRS on the first beam based at least in part on a success of the opportunistic beam-specific second LBT procedure for the first beam.

2. The method of claim 1, further comprising:
   determining the set of the multiple transmission beams based at least in part on a success of the first LBT procedure for at least one of the multiple transmission beams.

3. The method of claim 1, wherein performing the first LBT procedure comprises:
   performing the first LBT procedure over a union of the multiple transmission beams.

4. The method of claim 1, wherein:
   the first LBT procedure comprises an energy sensing LBT procedure.

5. The method of claim 1, wherein performing the first LBT procedure comprises one or both of:
   receiving a channel reservation signal on each of the multiple transmission beams; and
   sensing energy over at least one of the multiple transmission beams.

6. The method of claim 1, further comprising:
   transmitting, based at least in part on a success of the first LBT procedure, a reservation signal over a union of the multiple transmission beams.

7. The method of claim 6, wherein:
the reservation signal indicates that at least a portion of the shared radio frequency spectrum band is reserved.

8. The method of claim 1, wherein performing the first LBT procedure comprises:
performing the first LBT procedure over each of the multiple transmission beams prior to transmission of the DRS.

9. The method of claim 8, wherein transmitting the DRS comprises:
transmitting the DRS on each transmission beam corresponding to a successful first LBT procedure.

10. The method of claim 1, further comprising:
identifying gap intervals preceding each beam of the multiple transmission beams; and
performing a beam-specific LBT procedure for each beam of the multiple transmission beams in respective gap intervals preceding each beam.

11. The method of claim 10, further comprising:
determining the set of the multiple transmission beams based at least in part on a success of the beam-specific LBT procedure for at least one of the multiple transmission beams.

12. The method of claim 1, wherein:
the opportunistic DRS comprises at least one of a beam reference signal (BRS), a primary synchronization signal (PSS), a secondary synchronization signal (SSS), a physical broadcast channel (PBCH) message, or any combination thereof.

13. The method of claim 1, wherein:
the set comprises a single transmission beam and the DRS is transmitted periodically within a floating time window.

14. The method of claim 1, further comprising:
transmitting, prior to transmission of the opportunistic DRS, a reservation signal in a direction corresponding to the first beam.

15. The method of claim 1, further comprising:
receiving a DRS initiation request from a user equipment (UE); and
transmitting the opportunistic DRS based at least in part on the received DRS initiation request.

16. The method of claim 15, wherein:
the opportunistic DRS is transmitted within a time window after reception of the DRS initiation request.

17. The method of claim 1, wherein:
a priority class associated with the opportunistic DRS on the first beam is different from a priority class associated with the DRS on a corresponding beam of the multiple transmission beams.

18. The method of claim 1, wherein:
the opportunistic DRS on the first beam comprises more synchronization signal (SS) blocks than the DRS on a corresponding beam of the multiple transmission beams.

19. The method of claim 1, further comprising:
performing the opportunistic beam-specific second LBT procedure for each remaining beam of the multiple transmission beams; and
transmitting the opportunistic DRS on each remaining beam of the multiple transmission beams associated with a successful opportunistic beam-specific second LBT procedure.

20. The method of claim 19, further comprising:
staggering a time interval between a first instance of the opportunistic beam-specific second LBT procedure and a second instance of the opportunistic beam-specific second LBT procedure within a time window.

21. The method of claim 20, wherein:
locations of the opportunistic DRS transmissions on each beam of the multiple transmission beams within the time window are based at least in part on a success of the first instance of the opportunistic beam-specific second LBT procedure or the second instance of the opportunistic beam-specific second LBT procedure.

22. An apparatus for wireless communications, comprising:
a processor;
memory in electronic communication with the processor; and
instructions stored in the memory, wherein the instructions are executable by the processor to:
determine multiple transmission beams for transmission of a discovery reference signal (DRS) over a shared radio frequency spectrum band;
perform a first listen before talk (LBT) procedure for the DRS based at least in part on the multiple transmission beams;
transmit, based at least in part on the first LBT procedure, the DRS over the shared radio frequency spectrum band using a set of the multiple transmission beams;
perform an opportunistic beam-specific second LBT procedure for a first beam of the multiple transmission beams; and
transmit an opportunistic DRS on the first beam based at least in part on a success of the opportunistic beam-specific second LBT procedure for the first beam.

* * * * *